(12) United States Patent
Gundlach

(10) Patent No.: US 12,715,571 B2
(45) Date of Patent: Aug. 25, 2026

(54) ADDITIVE MANUFACTURED WING STRUCTURE HAVING A PLURALITY OF CHORDWISE WING SEGMENTS

(71) Applicant: AEVEX Aerospace, LLC, Solana Beach, CA (US)

(72) Inventor: John F. Gundlach, Manassas, VA (US)

(73) Assignee: AEVEX Aerospace, LLC, Solana Beach, CA (US)

( * ) Notice: Subject to any disclaimer, the term of this patent is extended or adjusted under 35 U.S.C. 154(b) by 154 days.

(21) Appl. No.: 18/098,515

(22) Filed: Jan. 18, 2023

(65) Prior Publication Data

US 2024/0166330 A1 May 23, 2024

Related U.S. Application Data

(60) Provisional application No. 63/427,032, filed on Nov. 21, 2022.

(51) Int. Cl.

*B64F 5/10* (2017.01)
*B33Y 80/00* (2015.01)
*B64C 3/14* (2006.01)

(52) U.S. Cl.

CPC ................ *B64C 3/14* (2013.01); *B33Y 80/00* (2014.12); *B64F 5/10* (2017.01)

(58) Field of Classification Search

CPC .............. B64C 3/24; B64C 3/20; B64U 30/14
See application file for complete search history.

(56) References Cited

U.S. PATENT DOCUMENTS 1,291,678 A * 1/1919 Kleckler .................. B64C 3/00 52/84
4,244,765 A 1/1981 Tokuno
6,523,781 B2 2/2003 Ragner
(Continued)

FOREIGN PATENT DOCUMENTS

AU 2015284731 B2 1/2016
CA 2693889 C 1/2016
(Continued)

OTHER PUBLICATIONS

McMaster-Carr, Catalog—Composites; downloaded Dec. 21, 2021; website: https://www.mcmaster.com/carbon-fiber/.
(Continued)

*Primary Examiner* — Brian M O'Hara
(74) *Attorney, Agent, or Firm* — Alston & Bird LLP

(57) ABSTRACT

An airfoil structure for an aircraft includes at least two components mated together adjacently along a chordwise direction. The at least two components extend in the chordwise direction from a front surface to a back surface, the front surface defines a contour of a leading edge of the airfoil structure, and the back surface defines contour of a trailing edge of the airfoil structure. Each of the at least two components includes receiving apertures defined therein at one or more spanwise locations along a spanwise direction, and the receiving apertures at each of the one or more spanwise locations are aligned with each other in the chordwise direction. The airfoil structure also includes a plurality of chordwise reinforcement elements extending through the aligned receiving apertures between the front surface and the back surface.

22 Claims, 18 Drawing Sheets

(56) References Cited

U.S. PATENT DOCUMENTS

| | | | | |
|---|---|---|---|---|
| 7,331,838 | B2 | 2/2008 | Shantz | |
| 7,963,815 | B2 | 6/2011 | Mead | |
| 8,286,907 | B2 | 10/2012 | Dohi et al. | |
| 8,366,055 | B2 | 2/2013 | Ulrich et al. | |
| 8,640,386 | B1 | 2/2014 | Griffith et al. | |
| 9,212,032 | B2 | 12/2015 | Vander Lind et al. | |
| 9,359,817 | B2 | 6/2016 | Allred, III et al. | |
| 9,599,993 | B2 | 3/2017 | Kumar et al. | |
| 9,709,026 | B2 | 7/2017 | Vander Lind | |
| 9,732,731 | B2 | 8/2017 | Hachtmann et al. | |
| 9,764,820 | B2 | 9/2017 | Kinne et al. | |
| 9,765,756 | B2 * | 9/2017 | Hancock | F03D 1/0675 |
| 9,784,243 | B2 | 10/2017 | Vander Lind et al. | |
| 9,803,061 | B2 | 10/2017 | Hattori et al. | |
| 9,896,201 | B2 | 2/2018 | Vander Lind | |
| 9,947,434 | B2 | 4/2018 | Patten et al. | |
| 10,023,307 | B2 | 7/2018 | Deng et al. | |
| 10,421,538 | B2 | 9/2019 | Seale et al. | |
| 10,501,605 | B2 | 12/2019 | Ichikawa et al. | |
| 10,533,537 | B2 | 1/2020 | GilroySmith et al. | |
| 10,829,229 | B2 | 11/2020 | MacCallum et al. | |
| 10,850,826 | B2 * | 12/2020 | Chengalva | B64C 3/22 |
| 10,960,468 | B2 | 3/2021 | Czinger et al. | |
| 10,967,576 | B2 | 4/2021 | Fiechter et al. | |
| 10,974,807 | B2 | 4/2021 | Grip et al. | |
| 11,052,989 | B2 | 7/2021 | Livieratos et al. | |
| 11,125,206 | B2 | 9/2021 | Kudsk | |
| 11,353,002 | B2 * | 6/2022 | Meeks | F03D 1/0675 |
| 11,597,490 | B1 * | 3/2023 | Gundlach | B64C 3/24 |
| 11,680,555 | B2 * | 6/2023 | Merzhaeuser | F03D 1/0675<br>416/226 |
| 2007/0215750 | A1 | 9/2007 | Shantz et al. | |
| 2008/0231058 | A1 | 9/2008 | Nicholson et al. | |
| 2012/0027608 | A1 * | 2/2012 | Martinez | F03D 1/0675<br>416/223 R |
| 2015/0136898 | A1 | 5/2015 | McCoy | |
| 2015/0284035 | A1 | 10/2015 | Reese | |
| 2017/0190418 | A1 | 7/2017 | Patten et al. | |
| 2018/0118326 | A1 | 5/2018 | Stockett et al. | |
| 2018/0229469 | A1 | 8/2018 | Zhao et al. | |
| 2018/0273174 | A1 | 9/2018 | Gifford | |
| 2018/0355842 | A1 | 12/2018 | Badger | |
| 2019/0100305 | A1 | 4/2019 | Patten et al. | |
| 2019/0152576 | A1 | 5/2019 | Singer | |
| 2019/0299522 | A1 | 10/2019 | Chapiro et al. | |
| 2020/0279495 | A1 | 9/2020 | von Flotow et al. | |
| 2020/0324892 | A1 | 10/2020 | Benedict et al. | |
| 2021/0363961 | A1 | 11/2021 | Hall et al. | |
| 2022/0017204 | A1 | 1/2022 | Helou, Jr. | |

FOREIGN PATENT DOCUMENTS

| | | | |
|---|---|---|---|
| CN | 101508343 | A | 8/2009 |
| CN | 203544368 | U | 4/2014 |
| CN | 103770342 | B | 4/2016 |
| CN | 103317732 | A | 8/2016 |
| CN | 205799931 | U | 12/2016 |
| CN | 106671402 | A | 5/2017 |
| CN | 206446681 | U | 8/2017 |
| CN | 208149467 | U | 11/2018 |
| CN | 108438218 | B | 9/2020 |
| EP | 2220364 | A1 | 8/2010 |
| EP | 2687548 | B1 | 1/2014 |
| EP | 2765155 | B1 | 8/2014 |
| EP | 3044264 | B1 | 7/2016 |
| EP | 3090172 | B1 | 11/2017 |
| EP | 3470335 | A1 | 4/2019 |
| EP | 3706981 | A1 | 9/2020 |
| IN | 00509DE2015 | A | 2/2016 |
| IN | 201641014265 | | 10/2017 |
| JP | 6519611 | B2 | 5/2019 |
| KR | 20180092594 | A | 8/2018 |
| RU | 2567496 | C1 | 11/2015 |
| WO | 2009013579 | A2 | 1/2009 |

OTHER PUBLICATIONS

Comseal; Products Catalog; downloaded Dec. 21, 2021; Copyright © 2021 Comseal Limited. https://comsealcomposites.com/product/carbon-fibre-rod/.

"3D Print Strong Parts in Continuous Carbon Fiber"; YouTube; Aug. 13, 2019; https://www.youtube.com/watch?v=Knx4JTN-ppY.

Rock West Composites website; downloaded Dec. 21, 2021; © Rock West Composites, Inc. All Rights Reserved. https://www.rockwestcomposites.com/.

International Search Report and Written Opinion, dated Mar. 24, 2023, for related International Application No. PCT/US2022/053596 (13 pages).

* cited by examiner 130
140,
142
140,
142
120
140,
144
140,
144
140,
142
110
101
103

130
32
38
120
38
110
101
103

224
224
220
220
222
222
101
103
134
130
149
149
149
149
120
149
149
149
149
149
110
149
149
112

2300

MATING TOGETHER AT LEAST TWO COMPONENTS ADJACENTLY ALONG A CHORDWISE DIRECTION, THE AT LEAST TWO COMPONENTS EXTENDING IN THE CHORDWISE DIRECTION FROM A FRONT SURFACE TO A BACK SURFACE, EACH OF THE AT LEAST TWO COMPONENTS INCLUDING RECEIVING APERTURES AT ONE OR MORE SPANWISE LOCATIONS ALIGNED WITH EACH OTHER IN THE CHORDWISE DIRECTION

2304

INSERTING A PLURALITY OF CHORDWISE REINFORCEMENT ELEMENTS THROUGH THE ALIGNED RECEIVING APERTURES

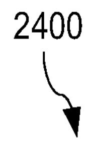

COUPLING A BASE JOINING SURFACE OF A MONOLITHIC FRONT COMPONENT TO A BASE SURFACE OF A MONOLITHIC CENTRAL COMPONENT, WHEREIN THE FRONT COMPONENT INCLUDES A FRONT SURFACE THAT DEFINES A CONTOUR OF A LEADING EDGE OF THE WING

2404

COUPLING A REAR JOINING SURFACE OF A MONOLITHIC REAR COMPONENT TO A REAR SURFACE OF THE CENTRAL COMPONENT, WHEREIN THE FRONT COMPONENT, THE CENTRAL COMPONENT, AND THE REAR COMPONENT ARE COUPLED TOGETHER IN A CHORDWISE DIRECTION

ADDITIVE MANUFACTURED WING STRUCTURE HAVING A PLURALITY OF CHORDWISE WING SEGMENTS

CROSS-REFERENCE TO RELATED APPLICATIONS

The present application claims the benefit of, and priority to, U.S. Provisional Patent Application No. 63/427,032 filed Nov. 21, 2022 entitled "ADDITIVE MANUFACTURED WING STRUCTURE HAVING A PLURALITY OF CHORDWISE WING SEGMENTS", the contents of which are hereby incorporated by reference in their entirety.

FIELD

The present disclosure relates generally to an additive manufactured airframe structure and, in particular, to additive manufactured airfoil structures.

BACKGROUND

Additive manufacturing of parts is desirable as it provides the ability to rapidly change out parts and keep the stock of parts low. However, the current technology does not provide for assembling structures from several components without loss in one or more of the mechanical properties of the structure.

BRIEF SUMMARY

In one aspect, an airfoil structure for an aircraft is provided. The airfoil structure includes at least two components mated together adjacently along a chordwise direction. The at least two components extend in the chordwise direction from a front surface to a back surface, the front surface defines a contour of a leading edge of the airfoil structure, and the back surface defines contour of a trailing edge of the airfoil structure. Each of the at least two components includes receiving apertures defined therein at one or more spanwise locations along a spanwise direction, and the receiving apertures at each of the one or more spanwise locations are aligned with each other in the chordwise direction. The airfoil structure also includes a plurality of chordwise reinforcement elements extending through the aligned receiving apertures between the front surface and the back surface.

In another aspect, an airfoil structure for an aircraft is provided. The airfoil structure includes, in sequence along a chordwise direction, a monolithic front component that includes a base joining surface and a front surface, the front surface defining a leading edge of the airfoil structure; a monolithic central component that includes a base surface coupled to the base joining surface and a rear surface opposite the base surface; and a monolithic rear component that includes a rear joining surface coupled to the rear surface.

In another aspect, a method of making an airfoil structure is provided. The method includes mating together at least two components adjacently along a chordwise direction. The at least two components extend in the chordwise direction from a front surface to a back surface, the front surface defines a contour of a leading edge of the airfoil structure, and the back surface defines contour of a trailing edge of the airfoil structure. Each of the at least two components includes receiving apertures defined therein at one or more spanwise locations along a spanwise direction, and the receiving apertures at each of the one or more spanwise locations are aligned with each other in the chordwise direction. The method also includes inserting a plurality of chordwise reinforcement elements through the aligned receiving apertures.

In another aspect, a method of making an airfoil structure is provided. The method includes coupling a base joining surface of a monolithic front component to a base surface of a monolithic central component. The front component includes a front surface that defines a contour of a leading edge of the airfoil structure. The method also includes coupling a rear joining surface of a monolithic rear component to a rear surface of the central component. The front component, the central component, and the rear component are coupled together in a chordwise direction.

BRIEF DESCRIPTION OF THE DRAWINGS

The novel features of the disclosure are set forth with particularity in the appended claims. A better understanding of the features and advantages of the present inventive concept will be obtained by reference to the following detailed description that sets forth illustrative examples, in which the principles of the disclosure are utilized, and the accompanying drawings of which:

FIG. 23 illustrates a flow diagram of an example method of making a wing for an aircraft according to at least one example of the present disclosure.

FIG. 24 illustrates a flow diagram of another example method of making a wing for an aircraft according to at least one example of the present disclosure.

DETAILED DESCRIPTION

Figure 1:
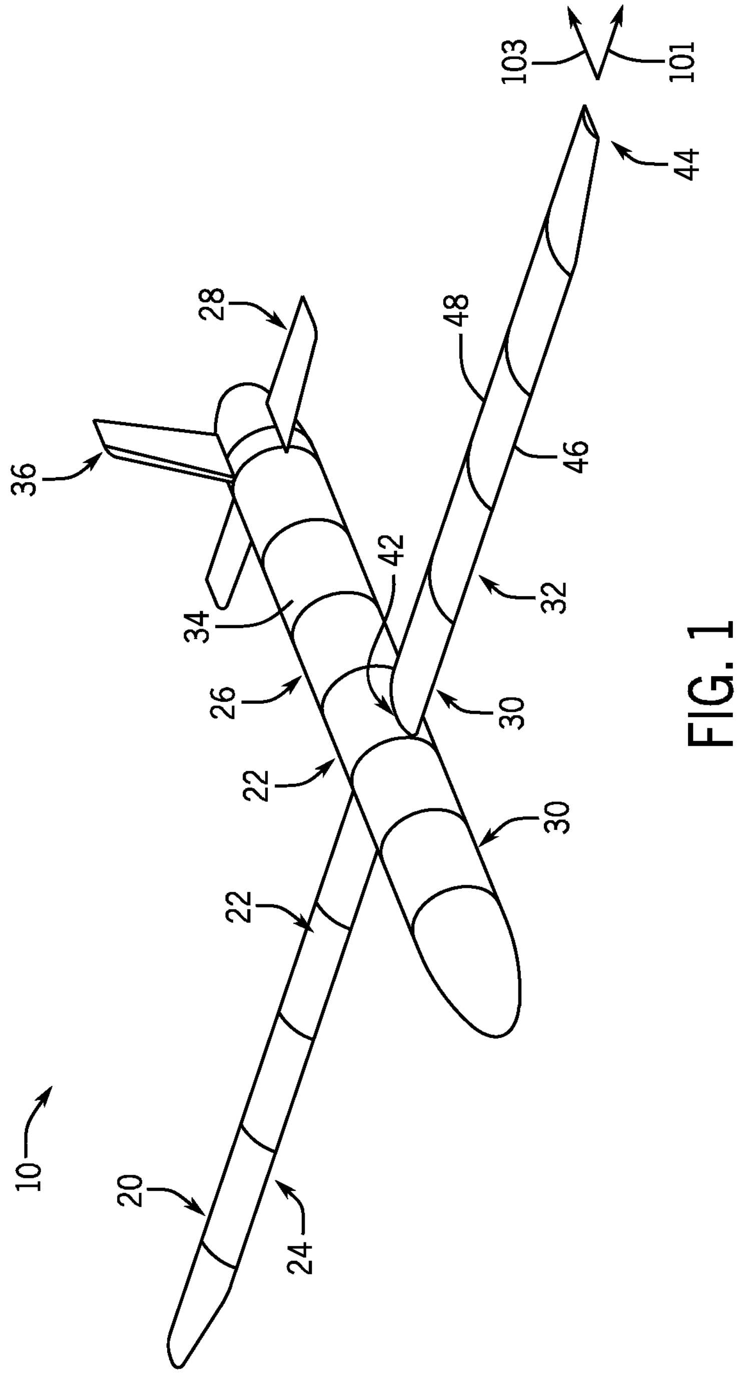
FIG. 1 illustrates an isometric view of an airframe including a plurality of airframe structures that have a plurality of additive manufactured airframe segments, according to at least one example of the present disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but can include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term substantially, as used herein, is defined to be essentially conforming to the particular dimension, shape or other word that substantially modifies, such that the component need not be exact. For example, substantially cylindrical means that the object resembles a cylinder, but can have one or more deviations from a true cylinder.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

The present disclosure solves the problem of conventional structures built using additive manufacturing being either too weak or heavy for use in desired applications. The present technology can be implemented in vehicles including boats, floating vessels, submersibles, and aircraft. Additionally, the present technology can be implemented with projectiles, ordinance, rockets, missiles, and/or other objects designed to move through air, space, and/or water. The present disclosure uses aircraft as the example, but other structures can be assembled using the technology. Specifically, an airframe can include one or more airframe structures that are formed using one or more assembled airframe components. The subject of the application is the assembled airframe components and airframe structures that are made from a plurality of additive manufactured airframe segments. Other technologies use very expensive materials such as carbon fiber which do not allow for easy development and implementation with standard additive manufacturing materials. The present technology uses additive manufacturing combined with reinforcement elements to provide both the necessary shear strength, tensile strength, and compressive strength.

The present disclosure presents an additive manufactured structure. The additive manufactured structure can include a plurality of additive manufactured components operable to be linked together in one or more assembled directions. Additionally, the additive manufactured structure includes a plurality of reinforcement elements operable to be received in corresponding receiving portions of the plurality of manufactured components and extending through the plurality of manufactured components in direction(s) normal to the one or more assembled directions.

The present disclosure presents reinforcement elements to link a plurality of additive manufactured components together in an assembled configuration. The receiving portion of the plurality of manufactured components is located on an interior of a corresponding one of the plurality of manufactured components. The receiving portion forms a substantially hollow portion for receiving the respective reinforcement elements. The reinforcement elements can be rod shaped and/or tube shaped, and can have any cross-sectional shape, including circular, oval, rectangular, or another shape. The reinforcement elements can be carbon fiber and/or pultruded. In other examples, the reinforcement elements can be fiberglass, E glass, S glass, aramid, metallic, and/or wood.

FIG. 1 illustrates an isometric view of an example airframe 10 including a plurality of airframe structures 20, such as a wing 24, a fuselage 26, a horizontal tail 28, and/or a vertical tail 36. The airframe 10 may be assembled from a plurality of air frame components 22, some or all of which may be additive manufactured. According to at least one example of the present disclosure, one or more of the airframe components 22 may form additive manufactured airframe segments 30. Each of the assembled airframe structures 20 can include a plurality of additive manufactured airframe segments 30. The illustrated airframe segments 30 can include wing segments 32 and/or fuselage segments 34, for example. As illustrated, the airframe 10 can be built using these plurality of airframe segments 30 in an assembled configuration. In the manufacturing of the airframe segments 30, a receiving portion of the airframe segments 30 is formed. The receiving portion is illustrated below with respect to the wing segment 32. The receiving portion is located on the interior of the airframe segment 30. In at least one example, the receiving portion extends through the airframe segments 30. Other airframe components 22 can also include formers, bulkheads, ailerons, elevators, rudders, stabilizers, spoilers, tabs, slats, and/or ribs.

The example in FIG. 1 does not include a motive force such as a jet engine or propeller. However, the present technology can be implemented with the desired motive force. Additionally, the present technology can be provided without a motive force such that the airframe 10 can be configured as a glider.

The present disclosure relates particularly to additive manufactured components 22 that may be used to form an airfoil structure, such as a wing 24, a horizontal tail 28, a vertical tail 36, or any other airfoil structure that may be used on a fixed wing or rotary aircraft (not shown). Airfoil structures may be described geometrically in terms of a spanwise direction 101, extending along a length of the airfoil structure from a root (generally affixed to the fuselage) to a tip (generally a free end), and a chordwise direction 103, extending along a width of the airfoil structure from a leading edge (generally facing toward a direction of flight) to a trailing edge opposite the leading edge. For example, in the case of the wing 24, the spanwise direction 101 extends from a root 42 to a tip 44 of the wing, and the chordwise direction 103 extends along a width of the wing from a leading edge 46 to a trailing edge 48. A typical additive manufacturing process uses a 3D printer to deposit or "print" successive thin layers of material, one on top of the other in a stacking direction (often called the "z direction"), to build a component.

Conventionally it is desirable to print airfoil structures by adding the successive layers of material in the spanwise direction of the airfoil structure, that is, to align the z direction of the printer with the spanwise direction 101 of the component. This is because the geometry of airfoil-shaped structures presents no adequate flat base for 3D printing, apart from a plane normal to the spanwise direction. For example, to print an airfoil-shaped component in the chordwise direction 103, one would have to somehow balance and stabilize the tightly curved leading edge 46 or tapered trailing edge 48 on the print bed at the beginning of, and throughout, the 3D printing process, which presents enormous difficulties in light of the need to precisely and smoothly form the contours of the airfoil shape for aerodynamic performance. However, in some cases aligning the z direction of the printer with the spanwise direction 101 of the airfoil structure may not allow additive manufacture of an integral component that encompasses an entire cross-section of the airfoil. For example, if a chordwise dimension of the airfoil structure exceeds about 16 inches, conventional 3D printer beds may not have sufficient area to accommodate the entire cross-section of the airfoil. An inability to print segments of the airfoil structure that include the entire cross-section of the airfoil may reduce the structural strength of the airfoil structure. Known 3D printers with larger beds may be undesirable because they typically are much more expensive, produce less precise builds, and have dramatically increased print times for each component.

Moreover, in some cases there may be a drawback to aligning the stacking direction z with the spanwise direction of an airfoil structure component. During operation of an aircraft, airfoil structures such as wings are subjected to significant torsional loads about an axis parallel to the spanwise direction, which induces significant shear stress in a plane normal to the spanwise direction, as well as significant bending loads about an axis parallel to the chordwise direction, which induces significant tensile stress along the spanwise direction. Additive manufactured components typically are less capable of handling shear stress in the x-y plane (i.e., in planes parallel to the plane of the printer bed), and are less capable of handling tensile stress in the z direction as compared to the x and y directions. This is because the material deposited in a single layer typically bonds together more strongly than material deposited across adjacent layers. In other words, layers of material stacked together can be pulled apart from each other in shear or vertically more easily than a single layer can be pulled apart. Thus, aligning the stacking direction z with the spanwise direction of an airfoil structure component typically orients the least strong shear and tensile directions of the component with the greatest shear and tensile stresses faced by the component.

The present disclosure solves these and other problems in some applications. In some embodiments, an airfoil structure for an aircraft includes at least two components mated together adjacently along a chordwise direction. The at least two components extend in the chordwise direction from a front surface to a back surface, wherein the front surface defines a contour of a leading edge of the airfoil structure and the back surface defines contour of a trailing edge of the airfoil structure. Each of the at least two components may be separately additively manufactured, and thus each component may be a monolithic component. However, because the at least two components are chordwise-adjacent, a cross-section of the resulting airfoil shape is divided among the at least two components. To improve the structural strength and integrity of the airfoil structure, each of the at least two components may include receiving apertures defined therein at one or more spanwise locations along a spanwise direction, and the receiving apertures at each of the one or more spanwise locations are aligned with each other in the chordwise direction. Chordwise reinforcement elements may be inserted through the aligned receiving apertures to add structural strength and stability to the mated components. The receiving apertures may be integrally formed within each component during the additive manufacturing process, improving an ease of manufacture and a structural integrity around the apertures. In some applications, the chordwise reinforcement elements may be configured to compress the mated components together. In some examples, this is achieved by pre-tensioning the chordwise reinforcement elements, bonding them to the components along the receiving apertures, and then releasing the pre-tension, which causes the chordwise reinforcing elements to compress the at least two components together in the chordwise direction. Additionally or alternatively, in certain applications, one or more of the at least two airfoil structure components may be additively manufactured with the stacking direction z of the 3D printer aligned with the chordwise direction, which may better align the direction of greatest strength of the printed component with the greatest shear and tensile stresses faced by the component when the aircraft is in operation.

In order to explain the present disclosure in more detail, the figures illustrate examples of the at least two components mated together along the chordwise direction as including three wing components 22. However, as noted above, embodiments of the disclosure may alternatively include two components, four components, or any suitable number of components joined sequentially in the chordwise direction and defining a leading and trailing edge of the airfoil structure. Moreover, the airfoil structure is not limited to a wing. For example, the airfoil structure may be a horizontal tail 28, a vertical tail 36, or another suitable airfoil structure.

Figures 2, 3, 4:
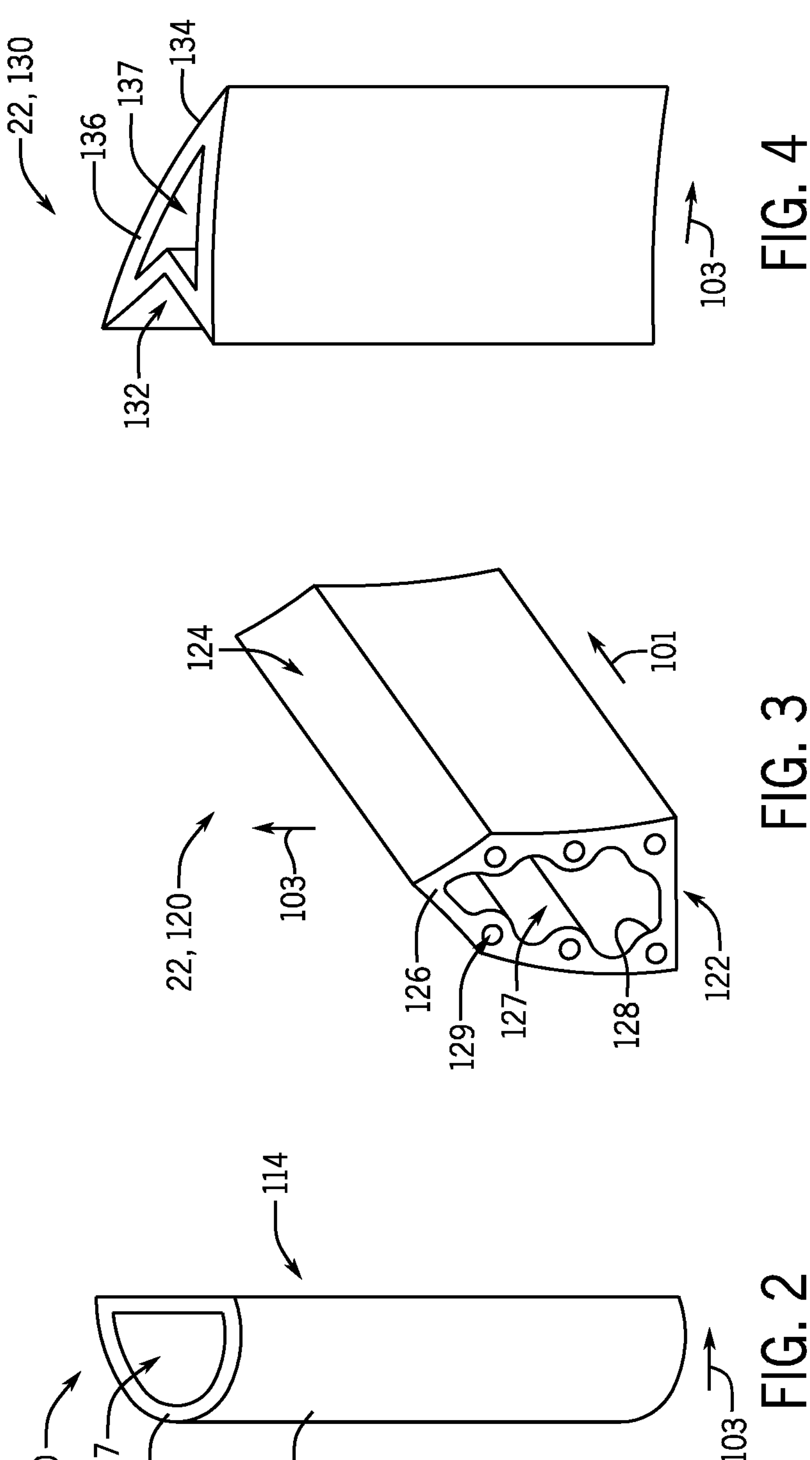
FIG. 2 illustrates an isometric view of a front component according to at least one example of the present disclosure.
FIG. 3 illustrates an isometric view of a central component according to at least one example of the present disclosure.
FIG. 4 illustrates an isometric view of a rear component according to at least one example of the present disclosure.

More specifically, FIGS. 2-4 illustrate the at least two components as, respectively, a front component 110, a central component 120, and a rear component 130, that can be additive manufactured separately and then joined together, sequentially along the chordwise direction 103, to form one of the wing segments 32. Because the front component 110, the central component 120, and the rear component 130, are each additively manufactured components, each of the front component 110, the central component 120, and the rear component 130 is a monolithic, integrally formed structure, which may improve a structural integrity of the wing 24 and also may reduce a number of component joining steps and equipment (e.g., fasteners, riveting tools) required to build the wing 24.

Figure 5:
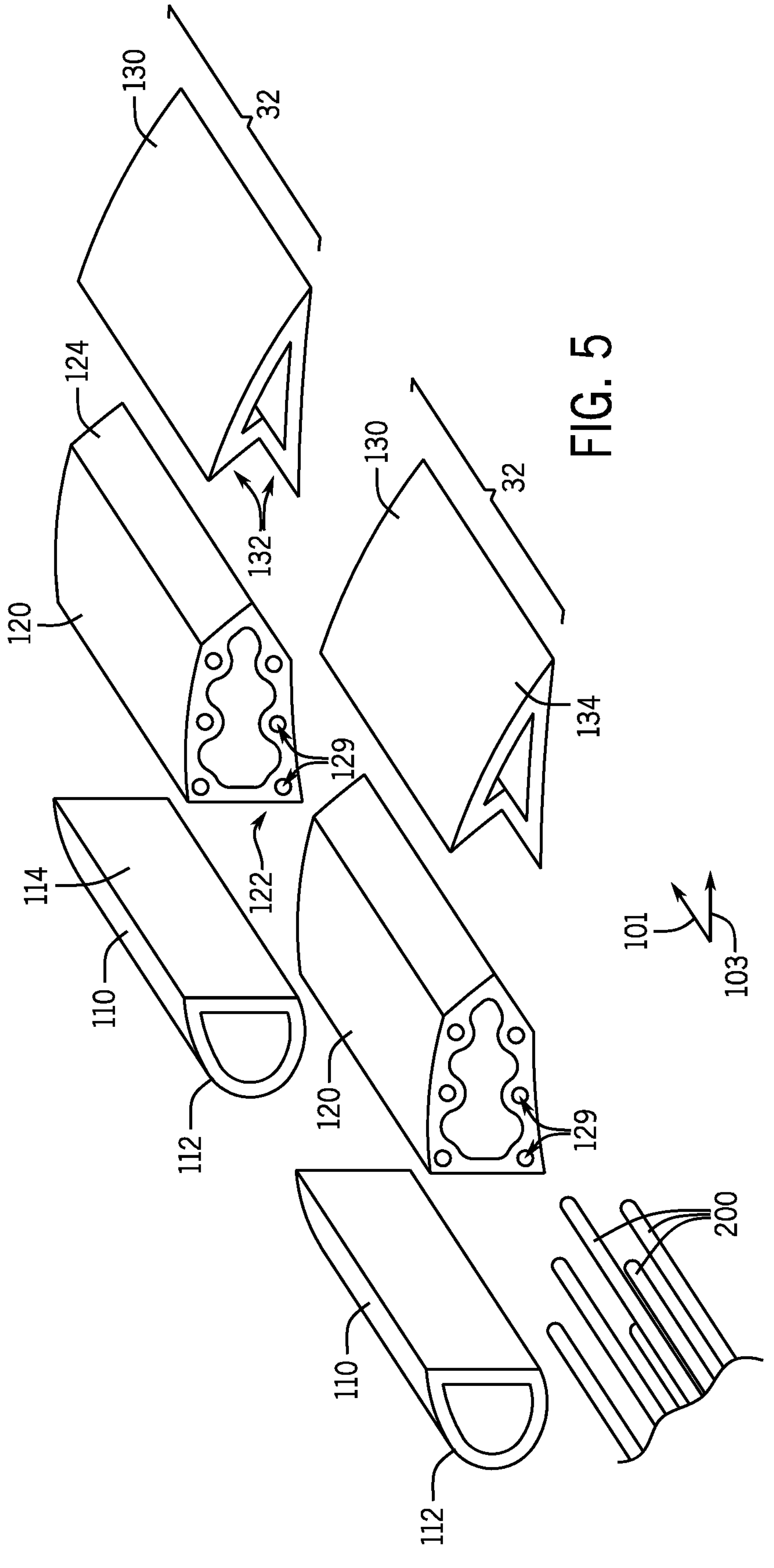
FIG. 5 illustrates an isometric view of two unassembled spanwise-adjacent wing segments according to at least one example of the present disclosure.
Figure 6:
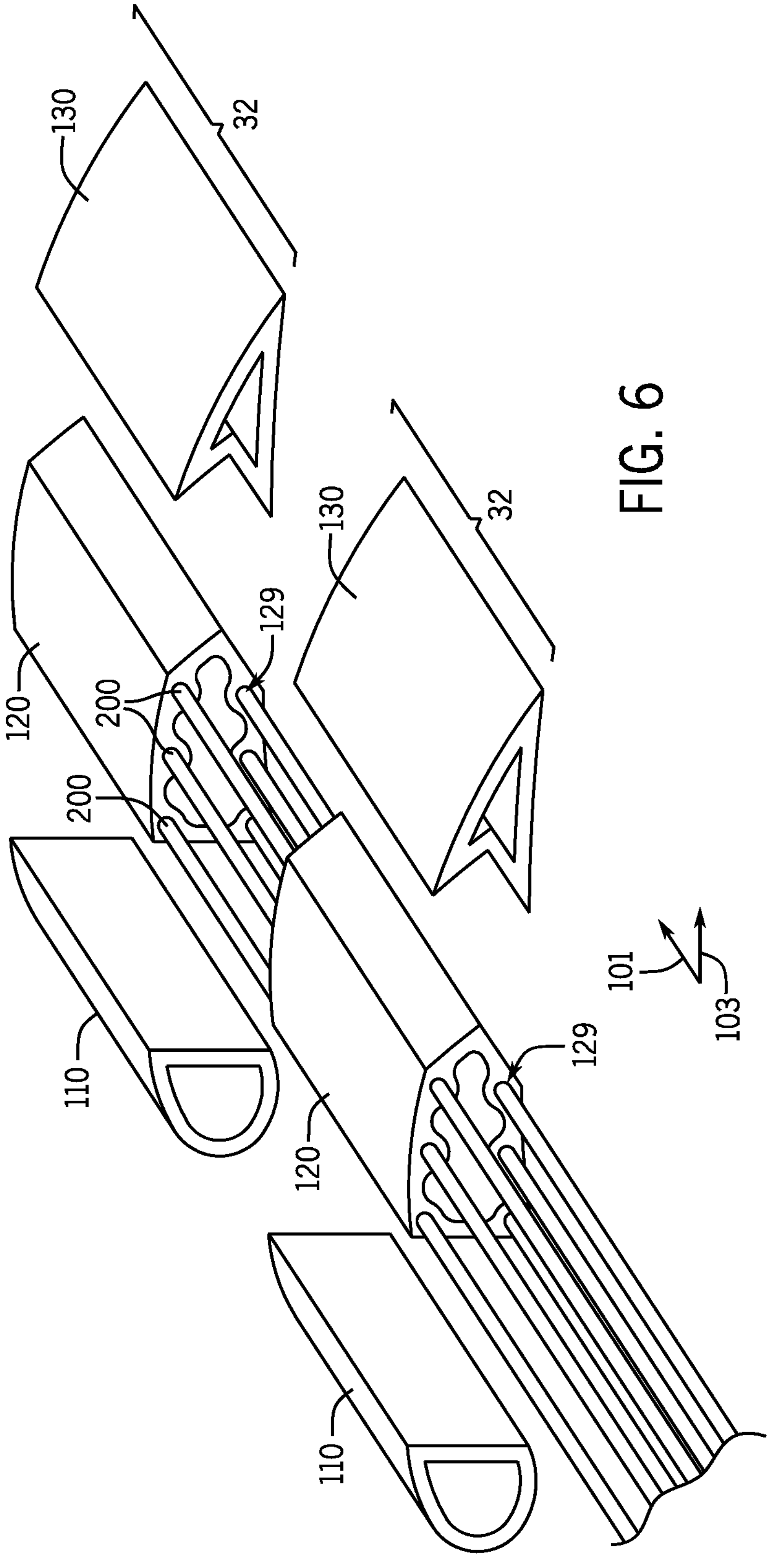
FIG. 6 illustrates an isometric view of two partially assembled spanwise-adjacent wing segments according to at least one example of the present disclosure.
Figure 7:
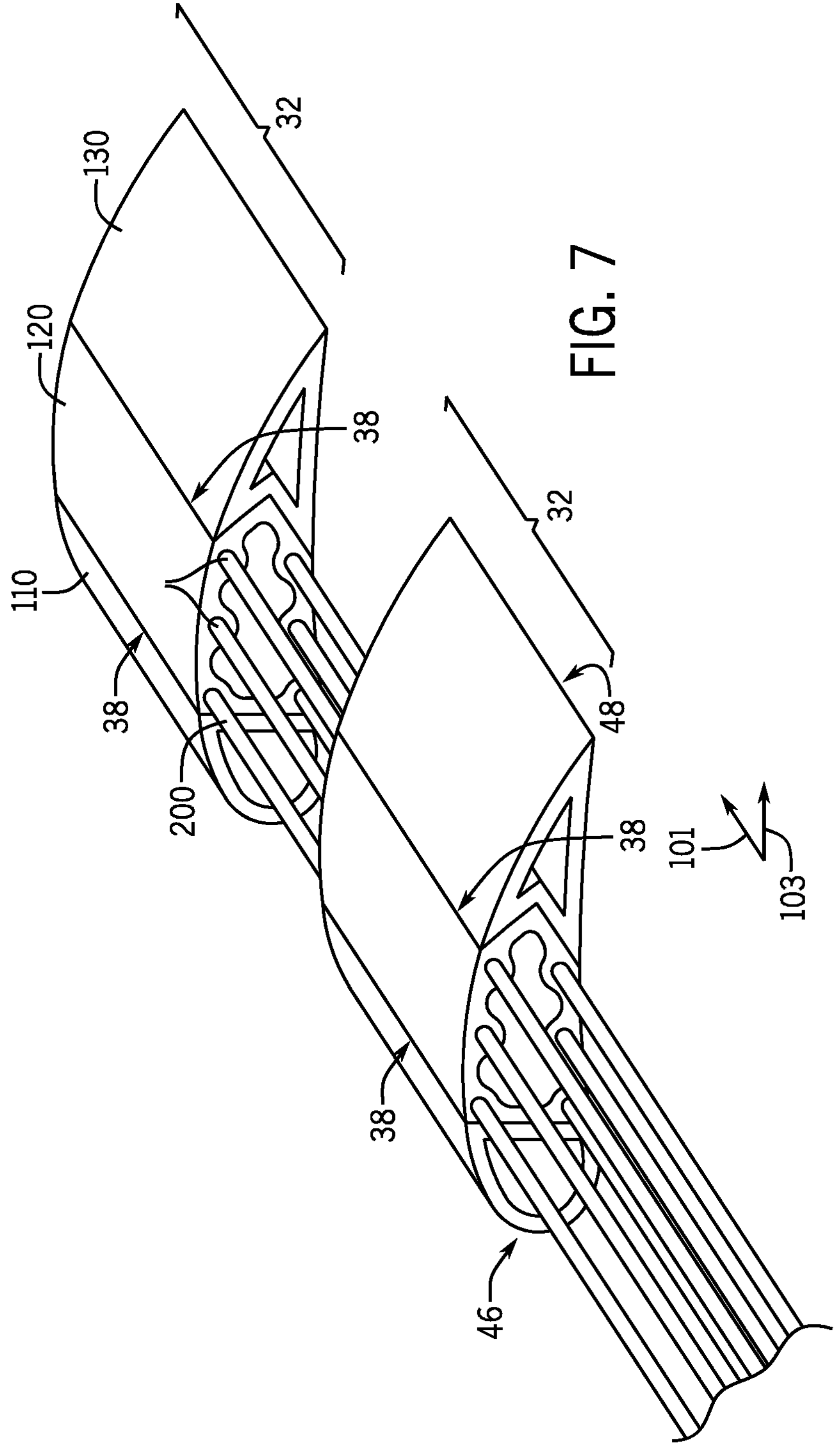
FIG. 7 illustrates an isometric view of a partially assembled wing having two spanwise-adjacent wing segments according to at least one example of the present disclosure.
Figure 8:
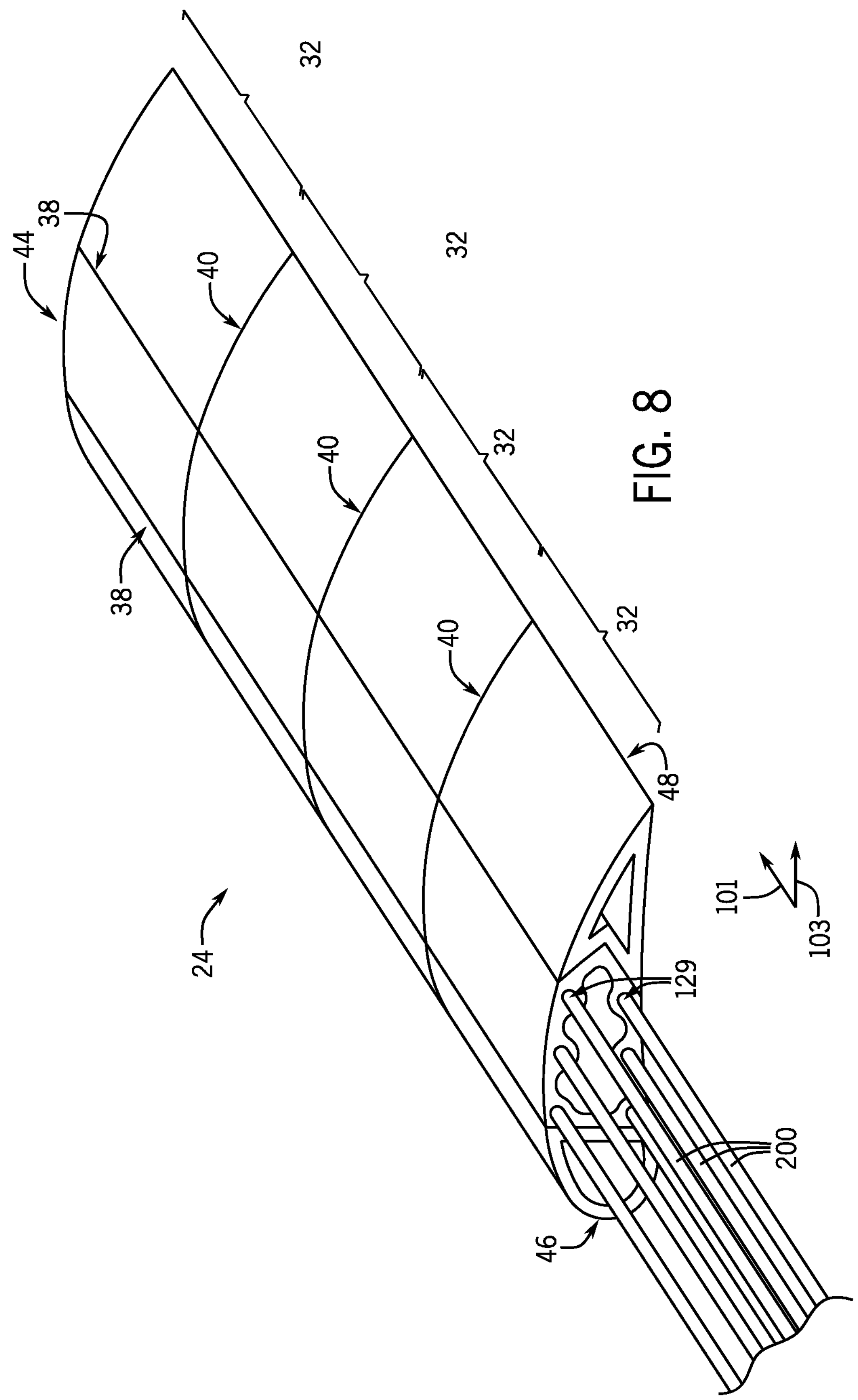
FIG. 8 illustrates an isometric view of wing having a plurality of spanwise-adjacent wing segments according to at least one example of the present disclosure.
Figure 9:
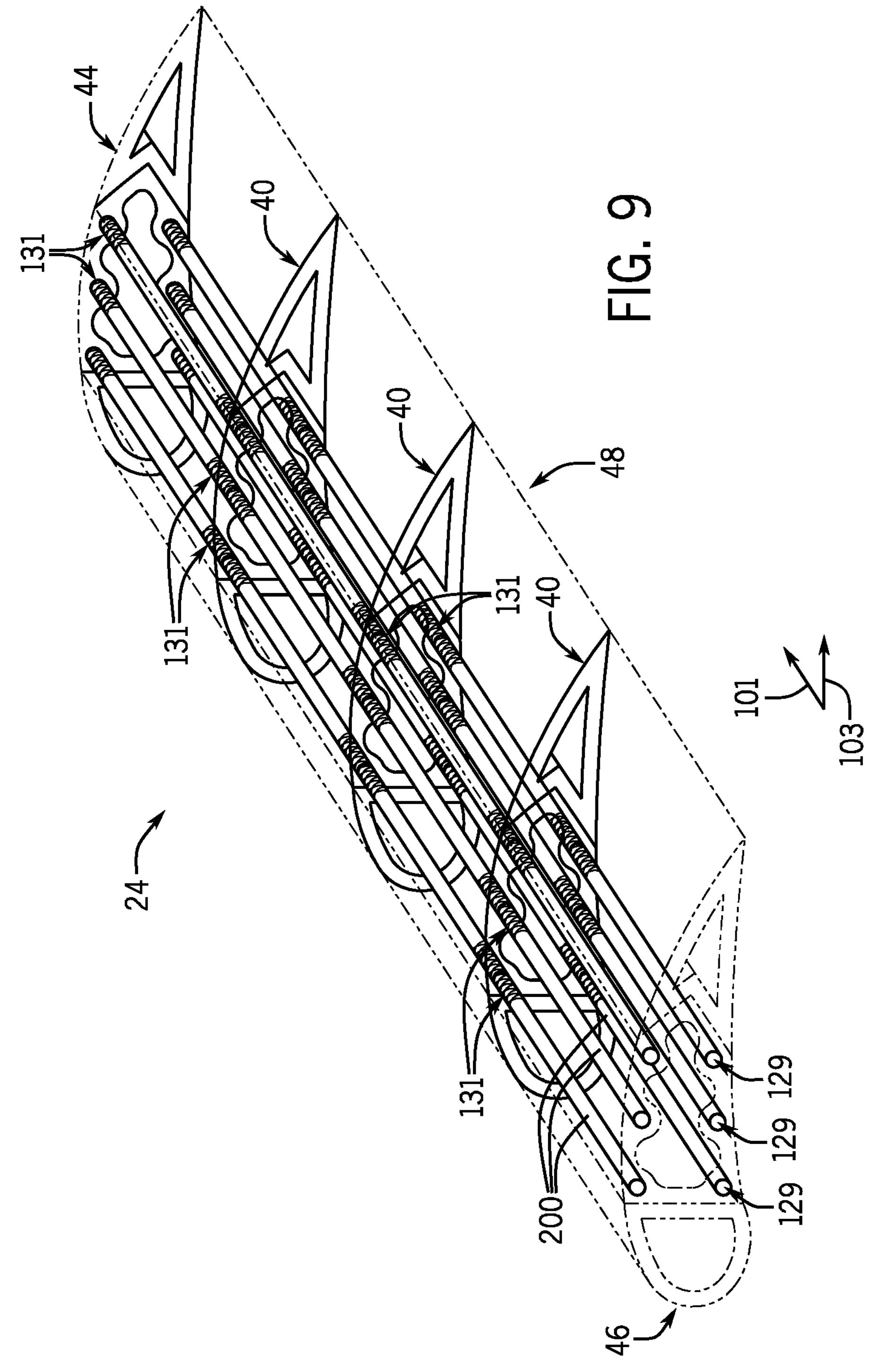
FIG. 9 illustrates an isometric partially transparent view of the wing of FIG. 8, according to at least one example of the present disclosure.

In particular, in FIGS. 2-4, each component 22 is oriented with respect to the z direction (e.g., the stacking direction of a 3D printer) to illustrate the direction in which layers may be added to form the component during the additive manufacturing process. FIGS. 5-7 illustrate a series of steps in assembling the wing 24 using the front components, the central components, and the rear components, along with a plurality of reinforcement elements 200; and FIGS. 8 and 9 illustrate views of portions of the assembled wing 24. The reinforcement elements 200 may also be referred to as a first plurality of reinforcement elements 200 or as spanwise reinforcement elements 200.

With reference to FIG. 3, the central component 120 includes an outer wall 126 that defines a hollow interior 127 extending along the spanwise direction 101. In some examples, the central component 120 is built in a stacking direction z generally aligned with the chordwise direction 103 of the wing. By unconventionally aligning the stacking direction with the chordwise direction of the central component 120, shear stress in planes normal to the spanwise direction (caused by wing torsion) occurs primarily in planes other than the x-y plane of the component, and tensile stress in the spanwise direction 101 (caused by bending of the wing) occurs primarily along the x or y directions rather than the z direction of the component. Thus, a structural performance of the central component 120 under typical operational loading of the airframe 10 may be improved by aligning the stacking direction z of the additive manufacturing process with the chordwise direction 103. However, examples in which the central component 120 is additive manufactured with the stacking direction z aligned with the spanwise direction 101 are also contemplated, as certain other advantages of the disclosure discussed herein may still be obtained.

In addition, the problems inherent in forming an airfoil-shaped component by stacking layers in the chordwise direction 103, as discussed above, are overcome by splitting the wing segment 32 into multiple components along the chordwise direction 103. Splitting the wing segment 32 into multiple chordwise components enables the central component 120 to be designed with a generally flat base surface 122 and a generally chordwise-tapered shape extending in the stacking direction z. The generally flat base surface 122 is printed first on the x-y plane of the 3D printer bed, providing a stable initial series of material layers upon which successive layers of the component can be printed. The base surface 122 may then be coupled to a separately manufactured, chordwise-adjacent front component 110 (an example of which is shown in FIG. 2) that provides a suitable airfoil shape for the leading edge 46 of the wing segment 32. Although certain advantages may thus be obtained by configuring the base surface 122 as generally flat, other shapes and contours for base surface 122 are also contemplated.

The central component 120 also includes a rear surface 124, opposite the base surface 122. In some examples, the rear surface 124 is sized and shaped for coupling to a chordwise-adjacent rear component 130 (shown in FIG. 4) that provides a suitable airfoil shape for the trailing edge 48 of the wing segment 32. Alternatively, the rear surface 124 itself may be contoured to provide the trailing edge 48 of the wing segment.

The central component 120 may also include a plurality of receiving channels 129 defined in the outer wall 126 and extending along the spanwise direction 101. Each of the receiving channels 129 may be configured to receive a corresponding reinforcement element 200 (shown in FIG. 5) inserted in the spanwise direction 101. In some examples, the receiving channels 129 are defined along an entire spanwise extent of the central component 120. In other examples, the receiving channels 129 are defined along less than an entire spanwise extent of the central component 120.

In some examples, the outer wall 126 includes reinforced regions 128 extending along the spanwise direction 101 and having an increased wall thickness, and the receiving channels 129 are defined in the reinforced regions 128 to provide increased structural support for the reinforcement elements. However, examples in which the outer wall 126 does not include reinforced regions 128 are also contemplated.

With reference to FIG. 2, the front component 110 also includes an outer wall 116 that defines a hollow interior 117 extending along the spanwise direction 101. Because the central component 120 may serve as the primary load-carrying wing component 22, or "torque box," of the wing segment 32, the stacking direction material property constraints of additive manufactured components, as discussed above, may be of less importance for the front component 110. Accordingly, in some examples, the front component 110 may be built in a stacking direction z generally aligned with the spanwise direction 101 of the component. However, examples in which the front component 110 is additive manufactured in a stacking direction z aligned other than with the spanwise direction 101 are also contemplated.

As noted above, the front component 110 is configured to couple in chordwise-adjacent fashion to the central component 120 to provide a suitable airfoil shape for the leading edge 46 of the wing segment 32. To that end, the front component 110 includes a base joining surface 114 configured to couple to the base surface 122 of the central component 120, and a front surface 112 opposite the base joining surface along the chordwise direction 103. For example, the base joining surface 114 may be configured to mate in a substantially face-to-face relationship with the base surface 122. The base surface 122 and the base joining surface 114 may be referred to as first and second joining surfaces in some examples. In the illustrated example, the front surface 112 is printed to have the desired contour of the leading edge 46 during the additive manufacturing process. Alternatively, the front surface is initially printed to extend at least partially beyond the desired contour, and a finishing process is performed on the initial front surface after additive manufacturing is completed to provide the desired contour of the leading edge 46. Examples are also contemplated in which the front component 110 indirectly provides the leading edge 46 for the wing segment. For example, the front surface 112 may be configured to couple to another forward chordwise-adjacent component (not shown) that is in turn contoured to form the leading edge 46.

With reference to FIG. 4, the rear component 130 also includes an outer wall 136 that defines a hollow interior 137 extending along the spanwise direction 101. Because the central component 120 may serve as the primary load-carrying wing component 22, or "torque box," of the wing segment 32, the stacking direction material property constraints of additive manufactured components, as discussed above, may be of less importance for the rear component 130. Accordingly, in some examples, the rear component 130 may be built in a stacking direction z generally aligned with the spanwise direction 101 of the component. However, examples in which the rear component 130 is additive manufactured in a stacking direction z aligned other than with the spanwise direction 101 are also contemplated.

As noted above, the rear component 130 is configured to couple in chordwise-adjacent fashion to the central component 120 to provide a suitable airfoil shape for the trailing edge 48 of the wing segment 32. To that end, the rear component 130 includes a rear joining surface 132 configured to couple to rear surface 124 of the central component 120, and a back surface 134 opposite the rear joining surface along the chordwise direction 103. For example, the rear joining surface 132 may include one or more surface portions configured to mate in a substantially face-to-face relationship with one or more surface portions of the rear surface 124. In some examples, the rear joining surface 132 of the rear component 130 and the rear surface 124 of the central component 120 are complementarily shaped to increase a mating surface area of the joint therebetween. For example, in the illustrated example, the rear surface 124 of the central component 120 has a wedge shape, and the rear joining surface 132 has a complementary receiving shape sized and oriented to mate in face-to-face relationship with both surface portions of the wedge shape. Shapes that provide an increased mating surface area may provide an advantage in examples in which the rear joining surface 132 and the rear surface 124 are bonded together using an adhesive, for example. Notwithstanding these potential advantages, other shapes are contemplated for the rear joining surface 132 and the rear surface 124. The rear joining surface 132 and the rear surface 124 may also be referred to as first and second joining surfaces in some examples.

In the illustrated example, the back surface 134 is printed to have the desired contour of the trailing edge 48 during the additive manufacturing process. Alternatively, the back surface is initially printed to extend at least partially beyond the desired contour of the trailing edge, and a finishing process is performed on the initial back surface after additive manufacturing is completed to provide the desired contour of the trailing edge 48 (shown in FIG. 1). Additionally or alternatively, a finishing process is performed on the back surface 134 after additive manufacturing is completed to provide the desired contour of the trailing edge 48. Examples are also contemplated in which the rear component 130 indirectly provides the trailing edge 48 for the wing segment. For example, the back surface 134 may be configured to couple to another rearward chordwise-adjacent component (not shown) that is in turn contoured to form the trailing edge 48.

In some examples, forming each wing segment 32 from a series of chordwise-adjacent, separately additively manufactured wing components 22, such as components 110, 120, and 130, facilitates provides advantages over the conventional approach of additively manufacturing wing segments that encompasses an entire chordwise dimension of the wing 34. For example, a 3D printer needed to print the separate components 110, 120, and 130 may have a smaller printer bed size than a 3D printer needed to print a wing segment that has the entire chordwise dimension of the wing.

FIG. 5 illustrates an example of two unassembled spanwise-adjacent wing segments 32 according to at least one example of the present disclosure. FIGS. 6-7 illustrate steps in assembling the two example spanwise-adjacent wing segments 32 together. In the example, each wing segment 32 includes three components 22 in a chordwise-adjacent arrangement: the central component 120, the front component 110, and the rear component 130. However, as noted above, it is contemplated that one or more wing segments may include only two components 22. For example, but without limitation, the front component 110 may be provided substantially as illustrated, and the central component 120 may mate to the front component 110 substantially as shown but also be contoured to provide the trailing edge 48. For another example, but without limitation, the rear component 130 may be provided substantially as illustrated, and the central component 120 may mate to the rear component 130 substantially as shown but also be contoured to provide the leading edge 46. Likewise, as noted above, it is contemplated that the one or more wing segments may include more than three components. For example, but without limitation, for an airfoil structure having a relatively large airfoil cross-section, one or more of the front component 110, the central component 120, and the rear component may be subdivided into two separate chordwise-adjacent components joinable at additional complementary mating surfaces similar to the joining surfaces illustrated herein.

Also in the example, like components 22 in each wing segment 32 have an identical size and shape, i.e., the central components 120 in both wing segments 32 have the same size and shape, the front components 110 in both wing segments 32 have the same size and shape, and the rear components 130 in both wing segments 32 have the same size and shape. However, it is contemplated that one or more of the front component 110, the central component 120, or the rear component 130 may vary in size or shape across wing segments 32 in a wing design. For example, a wing design may taper in cross-sectional size along the spanwise direction 101 from the root to the tip of a wing, and each of the front component 110, the central component 120, and the rear component 130 may accordingly taper in size along the spanwise direction.

The receiving channels 129 of each of the central components 120 are configured to align, along the spanwise direction 101, with the corresponding receiving channels 129 of at least one spanwise-adjacent central component 120. In FIG. 5, a plurality of reinforcement elements 200 are oriented for insertion into, and in some cases through, the aligned receiving channels 129 of the central components 120. In FIG. 6, the reinforcement elements are inserted completely through the receiving channels 129 of the central component 120 of a first wing segment and into the receiving channels 129 of a spanwise-adjacent second wing segment 32. In some examples, the central components of the wing segments 32 along the span of the wing may be coupled together by sliding the central components 120 along the reinforcement elements 200 and into serial spanwise abutment with each other.

In FIGS. 5-6, the front component 110, the central component 120, and the rear component 130 of each wing segment 32 are arranged and oriented for coupling together. In other words, the base joining surface 114 of the front component is oriented for coupling to the base surface 122 of the central component 120, and the rear joining surface 132 of the rear component 130 is oriented for coupling to the rear surface 124 of the central component 120. In FIG. 7, the front component 110 and the rear component 130 of each wing segment 32 have both been coupled to the corresponding central component 120 at respective wing-segment joints 38. In the illustrated example, the base joining surface 114 of the front component is coupled in face-to-face relationship with the base surface 122 of the central component 120 to form a forward wing-segment joint 38, and the rear joining surface 132 of the rear component 130 is received by the rear surface 124 of the central component 120 to form a rear wing-segment joint 38 (e.g., the two surfaces of the wedge shape of the rear surface 124 are coupled in respective face-to-face relationships with the two surfaces of the wedge-receiving shape of the rear joining surface 124 of the central component 120). However, other shapes and orientations are contemplated for the respective joining surfaces that form the wing-segment joints 38. In some examples, the joints 38 are formed by bonding the respective joining surfaces of the front component 110, the central component 120, and the rear component 130. Non-limiting examples of a bonding mechanism include adhesion, a pressure fit, or a friction fit. Additionally or alternatively, the front component 110, the central component 120, and the rear component 130 may be affixed to each other using a second plurality of reinforcement elements 220 extending in the chordwise direction, as discussed above and shown in FIG. 17.

Although FIGS. 6 and 7 illustrate the spanwise-adjacent central components 120 being engaged with and slid over the reinforcement elements 200 prior to the wing-segment joints 38 between chordwise-adjacent components of each wing segment 32 being formed, it is also contemplated that one or more of the wing-segment joints 38 between the chordwise-adjacent components of each wing segment 32 may be formed prior to the spanwise-adjacent central components 120 being engaged with and slid over the reinforcement elements 200.

FIG. 8 illustrates an example of a plurality of assembled spanwise-adjacent wing segments 32, and FIG. 9 illustrates a partially transparent view the assembled spanwise-adjacent wing segments 32. In the example, four assembled wing segments 32 have been joined together to form at least a portion of a wing 24. For example, the reinforcement elements 200 may be inserted into the receiving channels 129 of a first wing segment 32, and the first wing segment 32 may then be slid along the reinforcement elements 200 in the spanwise direction 101 to the tip 44 (or, alternatively, to the root 42) of the wing. Each successive wing segment 32 may be slid along the reinforcement elements 200 in the spanwise direction 101 into abutment with the preceding wing segment 32 at a respective seam 40. After assembly is complete, each of the spanwise reinforcement elements 200 extends within respective aligned sets of the receiving channels 129 of the spanwise-adjacent central components 120.

In some examples, the reinforcement elements 200 may be pre-tensioned during the insertion within and through the central components 120, and the pre-tension may be released after the reinforcement elements 200 are in their assembly position. As the pre-tensioned reinforcement elements 200 relax towards their rest state after the release of the pre-tension, the reinforcement elements 200 tend to compress the spanwise-adjacent central components 120 (and any chordwise-adjacent wing components 110 or 130 bonded to them) together, which may improve a structural integrity and performance of the wing 24. However, examples in which the reinforcement elements 200 are not-pre-tensioned are also contemplated.

As illustrated, the reinforcement elements 200 are substantially cylindrical. In other examples, the reinforcement elements 200 can be substantially shaped as a flat bar, angle, hexagonal, channel, tee bar, half round, half oval, and/or chamfer bar. Additionally, the reinforcement elements 200 can take other shapes suitable for insertion into a complementarily shaped receiving channel 129. As illustrated, the reinforcement elements 200 are in the form of solid rods. In other examples, the reinforcement elements 200 may be tubular, i.e., hollow inside.

The reinforcement elements 200 can be formed from different types of materials. In one example, the reinforcement elements 200 are formed from a high strength material such as carbon fiber. In another example, the reinforcement elements 200 can be carbon fiber rods. In still another example, the reinforcement elements 200 can be pultruded rods. In yet another example, the reinforcement elements 200 can be pultruded carbon fiber rods. In other examples, the reinforcement elements 200 can be formed from fiberglass, E glass, S glass, aramid, metal, and/or wood. In the illustrated example, there are six different reinforcement elements 200. In other examples, there can be any suitable number of reinforcement elements 200.

As illustrated, the reinforcement elements 200 extend continuously through the plurality of wing segments 32. Accordingly, the reinforcement elements 200 can provide additional tensile and compressive strength that is needed for a given wing 24. In some examples, the reinforcement elements 200 are bonded within the receiving channels 129. Non-limiting examples of a bonding mechanism include adhesion, a pressure fit, or a friction fit. For example, the reinforcement elements 200 can be bonded along substantially an entire length of the receiving channels 129. In other examples, the reinforcement elements 200 may be bonded along discrete portions of the receiving channels 129. For example, as illustrated in FIG. 9, the portions 131 of the receiving channels 129 along which the reinforcement elements 200 are bonded may be adjacent to, and extend through, the seams 40. In addition, the portions 131 of the receiving channels 129 along which the reinforcement elements 200 are bonded may be adjacent to the wing tip 44. In other examples, the reinforcement elements 200 may be bonded along any suitable portion of the receiving channels 129.

Figure 10:
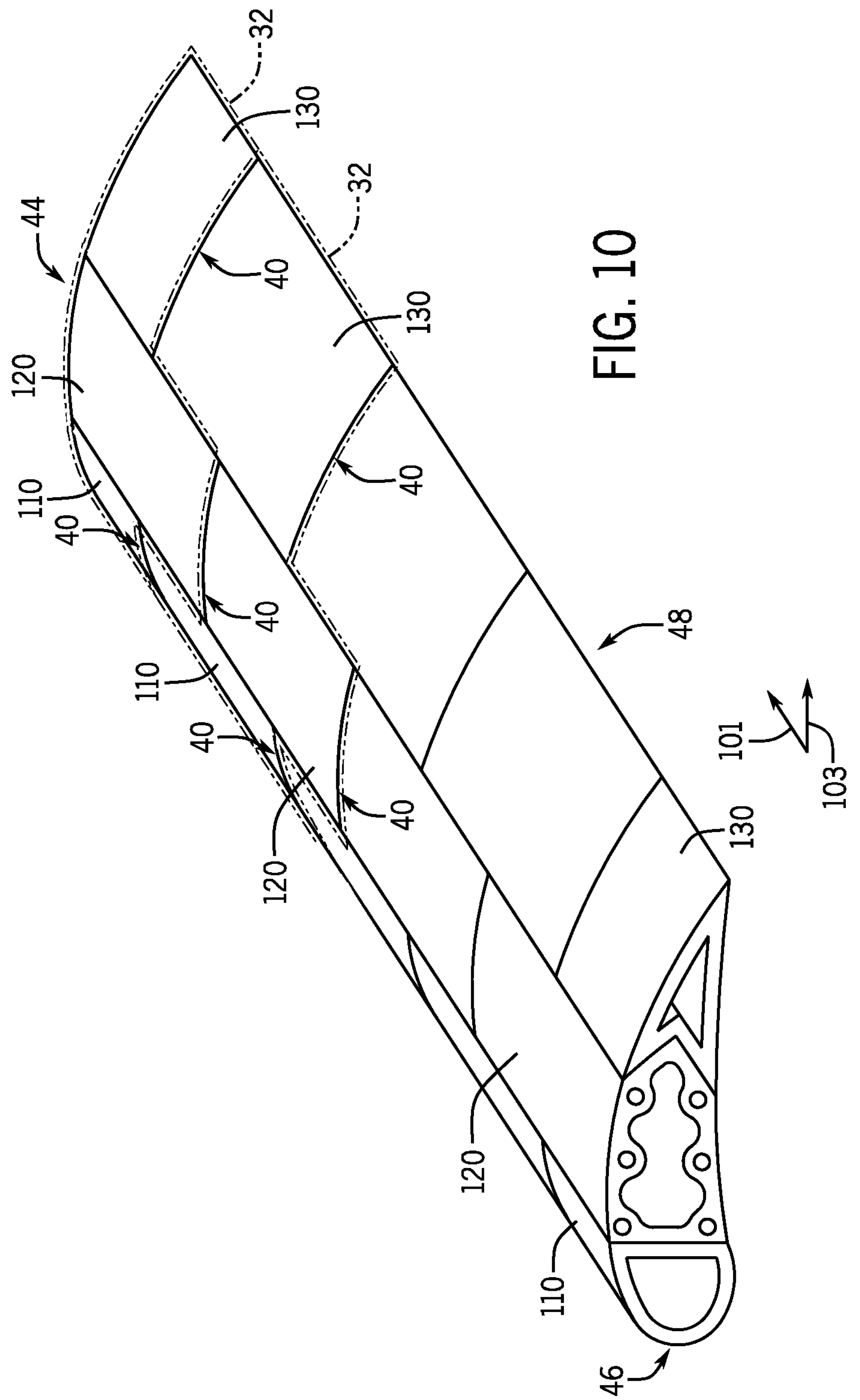
FIG. 10 illustrates an isometric view of an interleaved configuration of a wing according to at least one example of the present disclosure.

FIG. 10 illustrates an isometric view of an interleaved configuration of a wing 24 according to at least one example of the present disclosure. In this context, the term "interleaved" means that the seams 40 between central components 120 are not aligned with at least one of (i) the seams 40 between front components 110, or (ii) the seams 40 between rear components 130. As a result, as seen in FIG. 10, each of the wing segments 32 has a spanwise extent that varies between the central component 120 and at least one of the front components 110 or the rear components 130. In some examples, such interleaving improves a load distribution through the wing segments 32 along the chordwise direction 103, as compared to an arrangement with aligned chordwise-aligned seams 40 as shown in FIG. 8.

In the illustrated example, the interleaving is arranged such that the seam 40 between each pair of spanwise-adjacent front components 110 is adjacent to a mid-span point of a corresponding central component 120. In this configuration, the front components 110 adjacent to the wing tip 44 and to the wing root 46, respectively, have a span that is half the span of the other front components 110. However, other interleaving arrangements are also contemplated. In the illustrated example, the interleaving is for the rear components 130 is arranged to match the interleaving for the front components 110. However, non-matching interleaving of the front and rear components is also contemplated.

Figure 11:
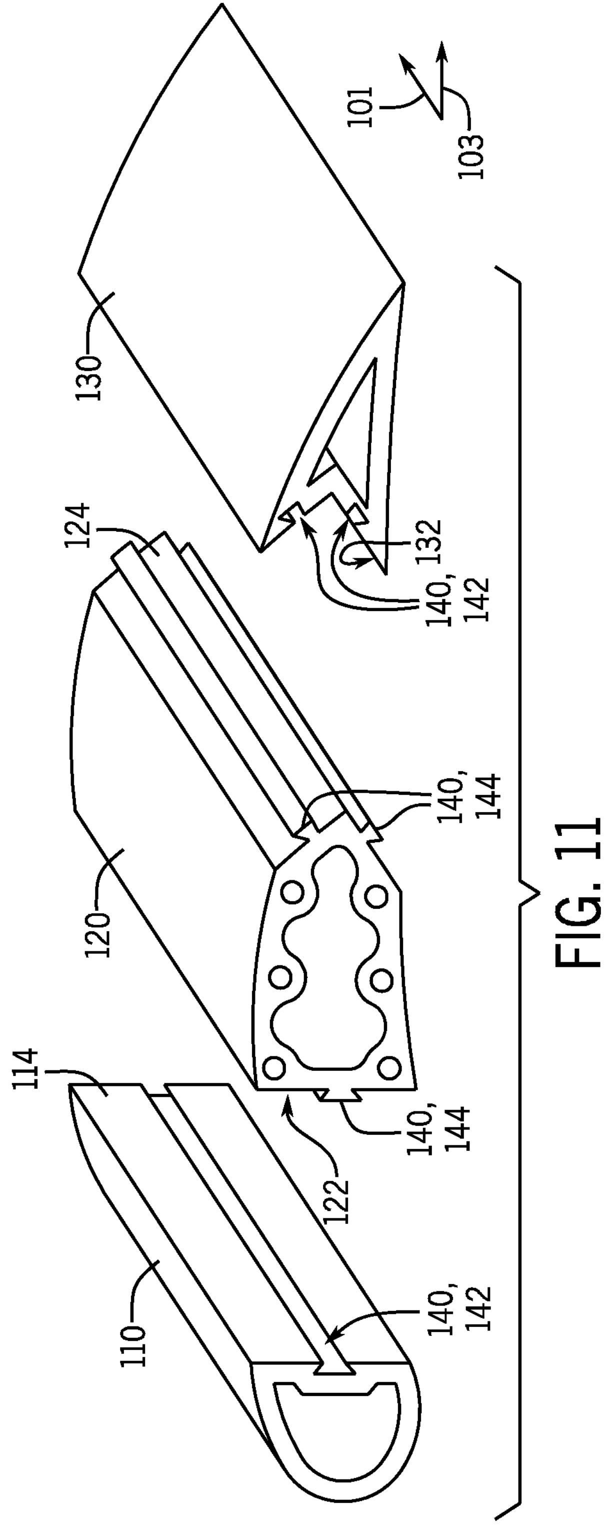
FIG. 11 illustrates an isometric view of another example of a front component, a central component, and a rear component of a wing according to at least one example of the present disclosure.

FIG. 11 illustrates another example of the front component 110, the central component 120, and the rear component 130. FIGS. 12-15 illustrate various stages of coupling the example components of FIG. 11 together. The wing components are generally as described above, but also include complementary mating features 140 on each pair of chordwise-adjacent mating surfaces.

For example, as shown in FIG. 11, the base joining surface 114 of the front component 110 includes one of the mating features 140 in the form of a dovetail slot 142 depending therefrom and extending in the spanwise direction 101. The central component 120 includes a complementary one of the mating features 140 in the form of a protrusion 144 extending from the base surface 122 and extending in the spanwise direction 101, and the protrusion 144 is sized and shaped to be slidably received in the dovetail slot 142. The reverse arrangement is also contemplated, in which the dovetail slot 142 depends from the base surface 122 of the central component 120 and the complementary protrusion 144 extends from the base joining surface 114 of the front component 110. In addition, slot and protrusion shapes other than dovetail are also contemplated.

In some examples, the presence of the mating feature 140 on the base surface 122 may reduce an ease of forming the central component 120 by additive manufacturing with the stacking direction z aligned with the chordwise direction 103 (see FIG. 3). However, other advantages of the disclosure, such as but not limited to ease-of-assembly advantages provided by the mating features 140 and, optionally, structural advantages provided by a second plurality of reinforcement elements 220 extending chordwise, as discussed above and shown in FIG. 17, may still be obtained in examples where the central component 120 is formed other than by additive manufacturing with the stacking direction z aligned with the chordwise direction 103.

Similarly in the illustrated example, as shown in FIG. 11, the rear joining surface 132 of the rear component 130 includes a pair of dovetail slots 142 depending therefrom (one on each of the surfaces of the wedge-receiving shape) and extending in the spanwise direction 101. The central component 120 includes a corresponding pair of protrusions 144 extending from the rear surface 124 and extending in the spanwise direction 101, and the protrusions 144 are sized and shaped to be slidably received in the corresponding dovetail slots 142. The reverse arrangement is also contemplated, in which the pair of dovetail slots 142 depend from the rear surface 124 of the central component 120 and the complementary protrusions 144 extend from the rear joining surface 132 of the rear component 130. Although two slots and two corresponding protrusions are illustrated, other numbers of slots and corresponding protrusions are also contemplated. In addition, complementary shapes other than dovetail slots and protrusions are also contemplated.

Figure 12:
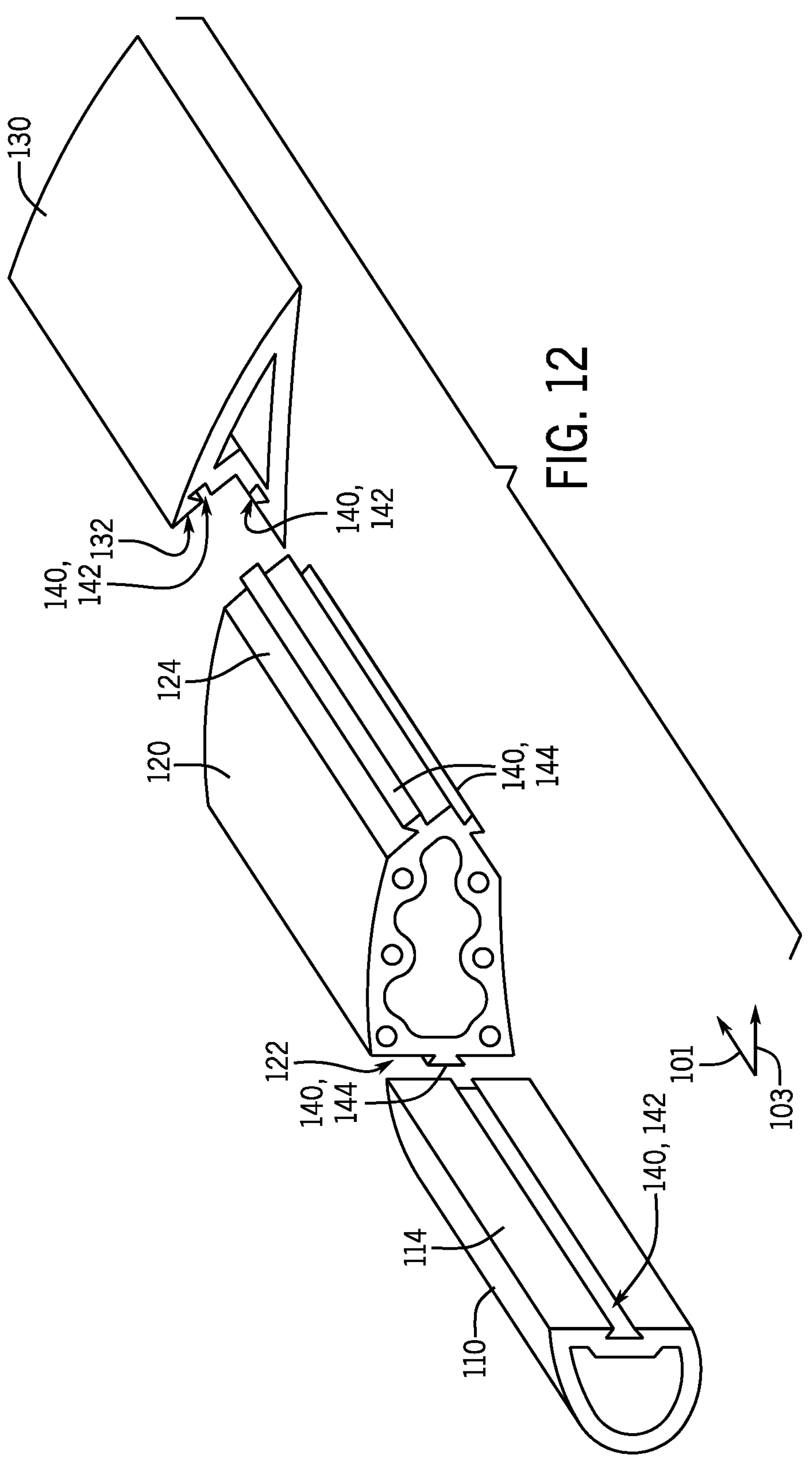
FIG. 12 illustrates an isometric view of the wing components of FIG. 11 in position for coupling, according to at least one example of the present disclosure.
Figure 13:
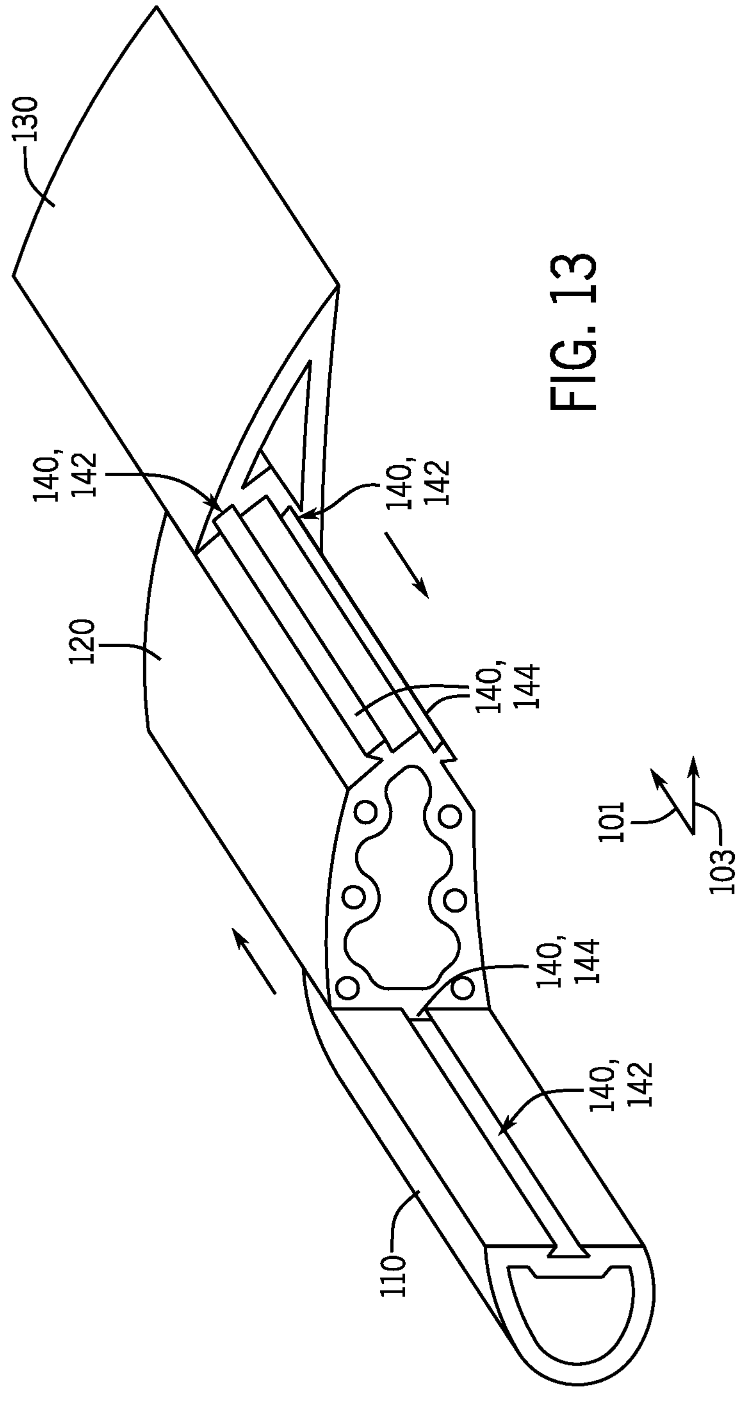
FIG. 13 illustrates an isometric view of the wing components of FIG. 11 at an initial stage of a coupling process, according to at least one example of the present disclosure.
Figures 14, 15:
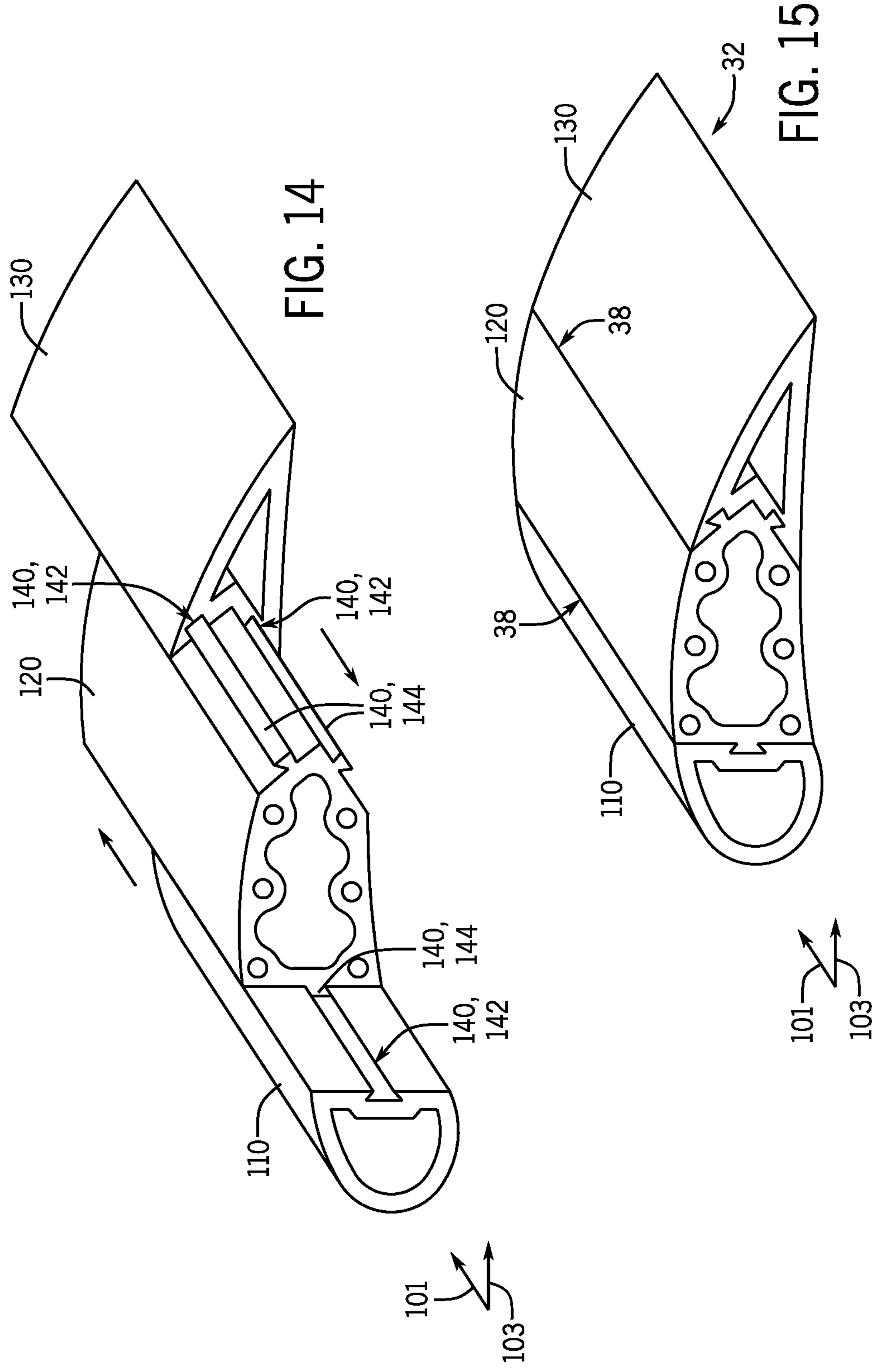
FIG. 14 illustrates an isometric view of the wing components of FIG. 11 at an intermediate stage of a coupling process according to at least one example of the present disclosure.
FIG. 15 illustrates an isometric view of the wing components of FIG. 11 in a coupled configuration according to at least one example of the present disclosure.

In FIG. 12, the front component 110 and the rear component 130 are illustrated as in position for an initiation of sliding engagement, in the spanwise direction 101, of the their respective mating features 140 with the front and rear mating features 140 the central component 120. In FIG. 13, the mating features 140 of the front component 110 and the rear component 130 are illustrated as engaged with, and slid a first distance in the spanwise direction 101 along, the mating features 140 of the central component 120. In FIG. 14, the mating features 140 of the front component 110 and the rear component 130 are illustrated as engaged with, and slid a second distance in the spanwise direction 101 along, the mating features 140 of the central component 120. In FIG. 15, the mating features 140 of the front component 110 and the rear component 130 are illustrated as substantially completely engaged with the mating features 140 of the central component 120, such that the front component 110 and the central component 120 form a first wing-segment joint 38, the central component 120 and the rear component 130 form a second wing-segment joint 38, and the front component 110, the central component 120, and the rear component 130 are coupled together to form the wing segment 32. Forming the joints 38 may further include bonding cooperating pairs of mating features 140 together, and additionally or alternatively may include bonding other portions of mating surfaces 114 and 122 together or other portions of mating surfaces 124 and 132 together. Non-limiting examples of a bonding mechanism include adhesion, a pressure fit, or a friction fit.

Although FIGS. 12-15 illustrate the mating features 140 of the front component 110 and the rear component 130 as being slid simultaneously, and in opposite spanwise directions, into engagement with the mating features 140 of the central component 120, this is solely for purposes of illustration. Examples in which the mating features 140 of the front component 110 and the rear component 130 are slid non-simultaneously, and/or in a same spanwise direction, into engagement with the mating features 140 of the central component 120 are also contemplated. Moreover, although the illustration shows the wing-segment joints 38 between the chordwise-adjacent components of each wing segment 32 being formed prior to the central component 120 being engaged with and slid over the reinforcement elements 200 (shown in FIG. 7), it is also contemplated that the central component 120 may be engaged with and slid over the reinforcement elements 200 prior to the wing-segment joints 38 being formed.

Figure 16:
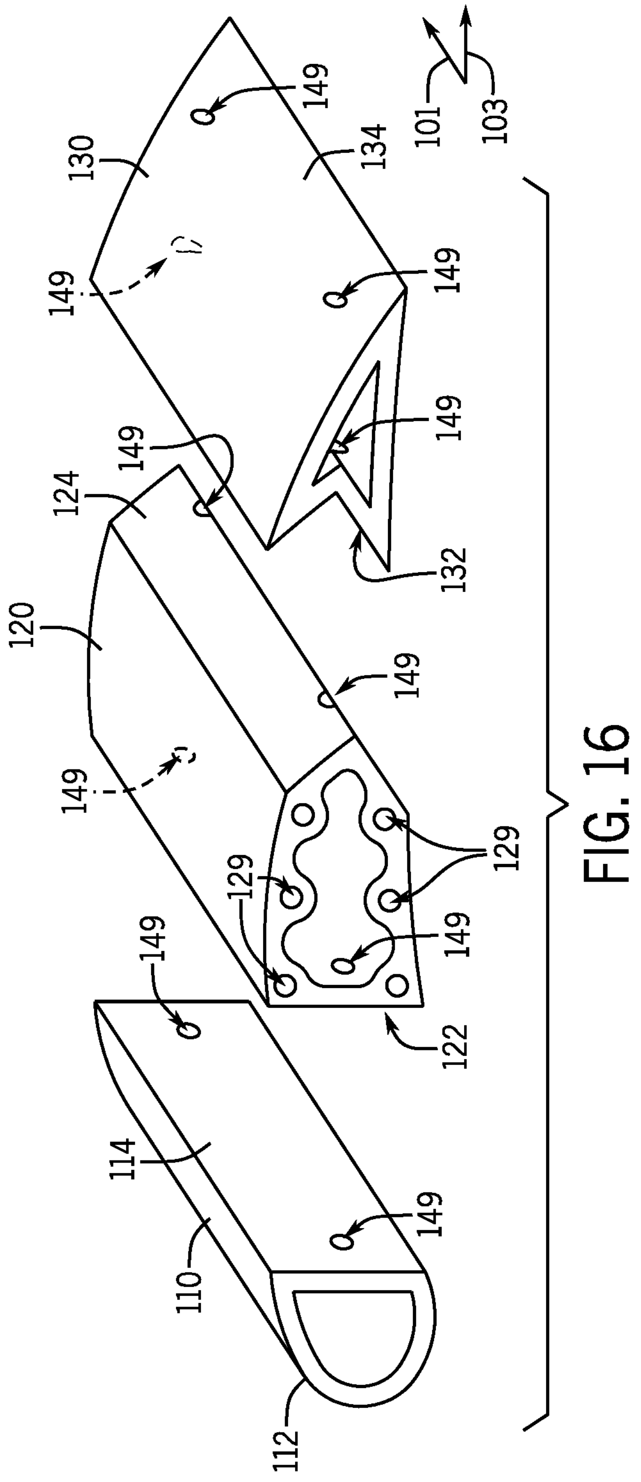
FIG. 16 illustrates an isometric view of yet another example of a front component, a central component, and a rear component of a wing according to at least one example of the present disclosure.

FIG. 16 illustrates another example of the front component 110, the central component 120, and the rear component 130. FIGS. 17-20 illustrate various stages of coupling the example components of FIG. 16 together. The wing components 110, 120, 130 are generally as described above, but also include receiving apertures 149 defined therein. The receiving apertures 149 are sized and oriented to receive a second plurality of reinforcement elements 220 therethrough to facilitate coupling together and reinforcing the wing components 110, 120, 130. The second plurality of reinforcement elements 220 may also be referred to as chordwise reinforcement elements 220, and may be made from the same materials and in the same shapes as discussed above with respect to the spanwise reinforcement elements 200. Although the illustrated example does not show the mating features 140 shown in FIGS. 11-15, it is contemplated that the mating features 140 substantially as described above may also be included in combination with the receiving apertures 149 and the chordwise reinforcement elements 220.

In the illustrated example, the receiving apertures 149 are positioned on each wing component 110, 120, 130 at two spanwise locations along the spanwise direction 101. However, it is also contemplated that the receiving apertures 149 could be positioned at one spanwise location along each component, or at more than two spanwise locations along each component. The receiving apertures 149 at each spanwise location are configured to align with each other in the chordwise direction 103 when the front component 110, the central component 120, and the rear component 130 are positioned for coupling into the wing segment 32. The alignment of the receiving apertures 149 at each spanwise location facilitates receiving the chordwise reinforcement elements 220 through the coupled wing components.

Figure 17:
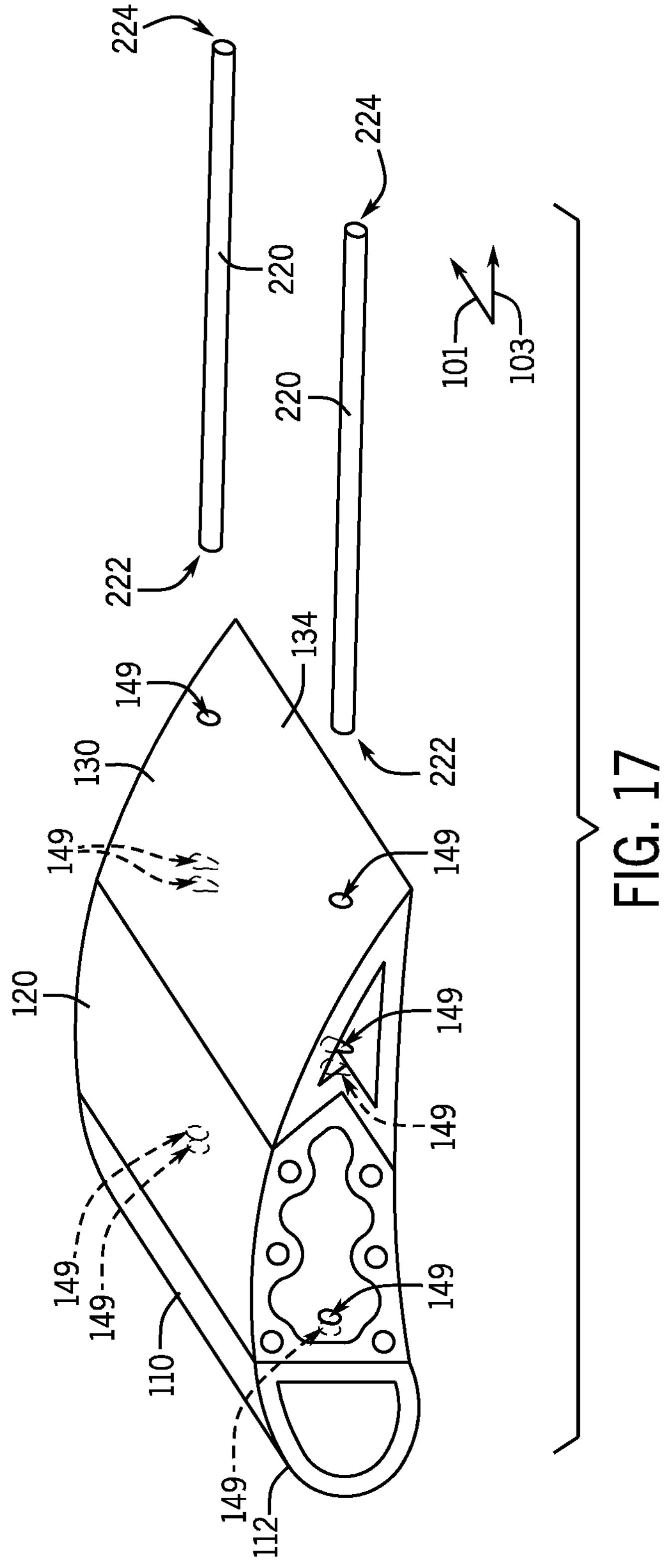
FIG. 17 illustrates an isometric view of the wing components of FIG. 16 in position for receiving chordwise reinforcement elements, according to at least one example of the present disclosure.
Figure 18:
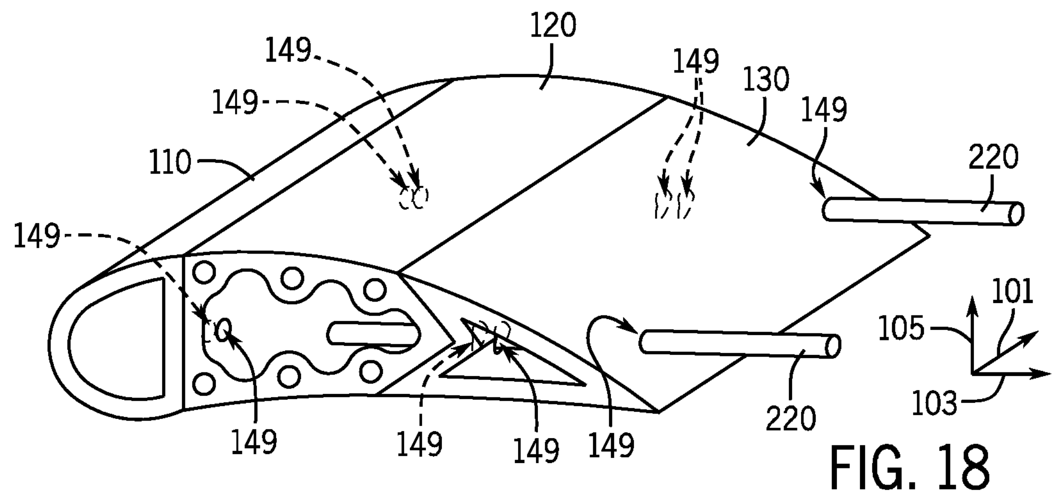
FIG. 18 illustrates an isometric view of the wing components of FIG. 16 at an initial stage of a reinforcement element insertion process according to at least one example of the present disclosure.
Figure 19:
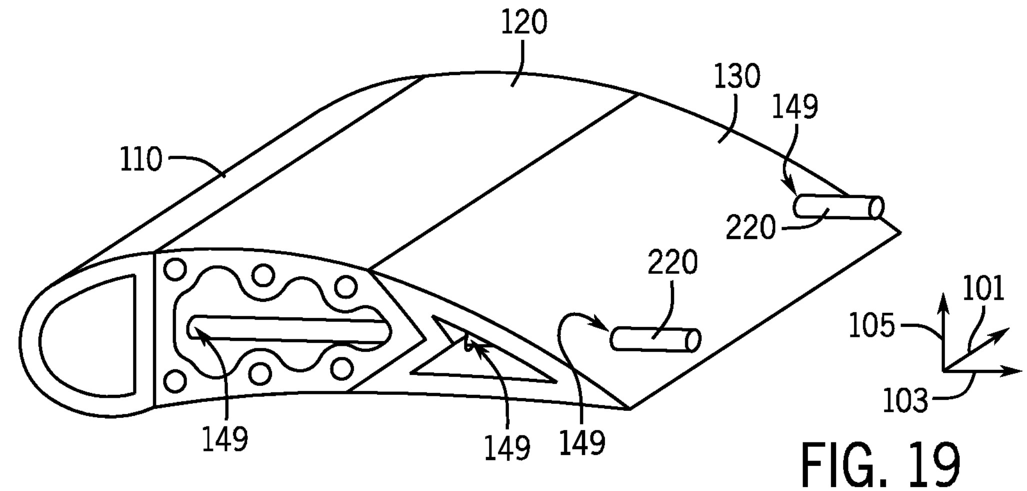
FIG. 19 illustrates an isometric view of the wing components of FIG. 16 at an intermediate stage of a reinforcement element insertion process according to at least one example of the present disclosure.
Figure 20:
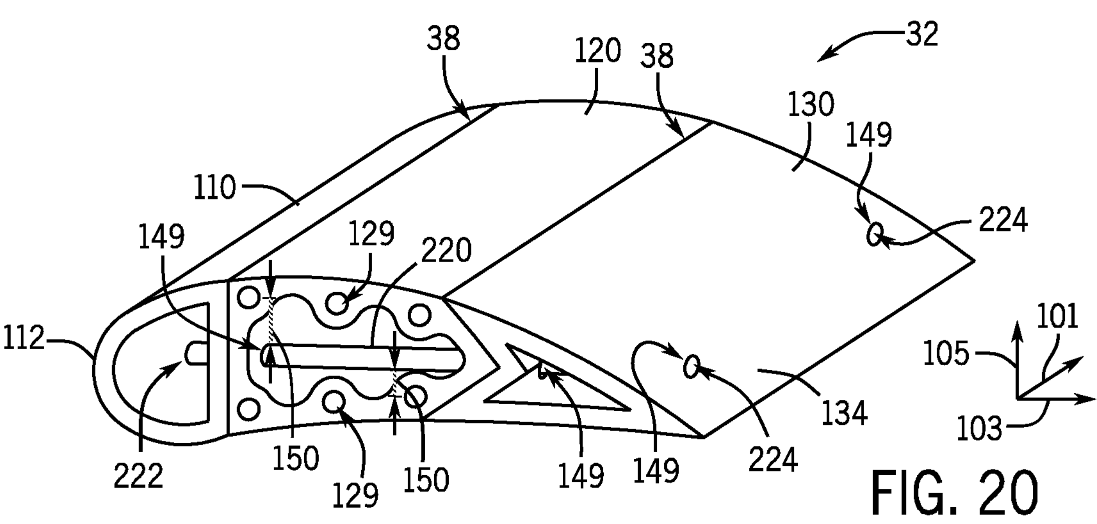
FIG. 20 illustrates an isometric view of the wing components of FIG. 16 in a coupled and reinforced configuration according to at least one example of the present disclosure.

In FIG. 17, the front component 110, the central component 120, and the rear component 130 are illustrated as in position for an initiation of sliding engagement, in the chordwise direction 103, of their aligned respective receiving apertures 149 by the chordwise reinforcement elements 220. In the illustrated example, the wing components 110, 120, 130 are configured for initial insertion of the chordwise reinforcement elements 220 through the back surface 134 of the rear component. More specifically, the central component 120 and the rear component 130 each include two aligned receiving apertures 149 along each of the spanwise locations, and the front component 110 includes only one receiving aperture 149 at each of the spanwise locations. This is to facilitate a sliding insertion of the chordwise reinforcement elements 220 through, first, the receiving apertures 149 defined in the back surface 134 of the rear component 130, second, through the receiving apertures 149 defined in the rear joining surface 132 of the rear component 130, and third, through the receiving apertures 149 defined in the rear surface 124 of the central component 120, as illustrated in FIG. 18; fourth, through the receiving apertures 149 defined in the base surface 122 of the central component 120, as illustrated in FIG. 19; and fifth, through the receiving apertures 149 defined in the base joining surface 114 of the front component 110, as illustrated in FIG. 20. In the illustrated example, no receiving apertures 149 are defined in the front surface 112 of the front component 110, as the chordwise reinforcement elements 220 are sized not to extend into or through the front surface 112. Instead, first ends 222 of the chordwise reinforcement elements 220 are covered by the front surface 112. However, it is also contemplated that receiving apertures 149 could also be defined in the front surface 112. For example, the wing components 110, 120, 130 could be configured for initial insertion of the chordwise reinforcement elements 220 through the front surface 112 of the front component, and then in sequence through the other components in the opposite chordwise direction as that illustrated in FIGS. 17-20. In that embodiment, second ends 224 of the chordwise reinforcement elements 220 are covered by the back surface 134 after insertion is complete. Likewise, it is also contemplated that the chordwise reinforcement elements 220 could first be inserted through the receiving apertures of the middle wing component 120, such that the first ends 222 of the inserted chordwise reinforcement elements 220 extend outside the middle component 120 forward along the chordwise direction 103 and the second ends 224 of the inserted chordwise reinforcement elements 220 extend outside the middle component 120 backward along the chordwise direction 103. Then, the receiving apertures 149 of the front wing component 110 can be slid over the first ends 222, and the receiving apertures 149 of the rear wing component 130 can be slid over the second ends 224, in order to mate the wing components 110, 120, and 130 together. In that embodiment, the first ends 222 may be covered by the front surface 112 and the second ends 224 may also be covered by the back surface 134 when the wing components are mated together.

In FIG. 20, the chordwise reinforcement elements 220 are substantially engaged with the receiving apertures 149 in the front component 110, the central component 120, and the rear component 130, such that the front component 110 and the central component 120 form the first wing-segment joint 38, the central component 120 and the rear component 130 form the second wing-segment joint 38, and the front component 110, the central component 120, and the rear component 130 are coupled together to form the wing segment 32. The chordwise reinforcement elements 220 may be bonded within one or more of the receiving apertures 149 to reinforce the joints 38. Forming the joints 38 may further include bonding portions of mating surfaces 114 and 122 together or portions of mating surfaces 124 and 132 together, and additionally or alternatively may include bonding cooperating pairs of mating features 140 together as described above with respect to FIG. 15. Non-limiting examples of a bonding mechanism include adhesion, a pressure fit, or a friction fit.

In some examples, similar to the use of pre-tension described above with respect to the spanwise reinforcement elements 200, the chordwise reinforcement elements 220 may be pre-tensioned during the insertion within and through the front component 110, the central component 120, and the rear component 130, and while the chordwise reinforcement elements are bonded within the receiving apertures 149. The pre-tension may be released after the chordwise reinforcement elements 220 are in their assembly position (for example, after an adhesive used for the bonding has cured). As the pre-tensioned chordwise reinforcement elements 220 relax towards their rest state after the release of the pre-tension, the chordwise reinforcement elements 220 tend to compress the chordwise-adjacent front component 110, central component 120, and rear component 130 together, which may improve a structural integrity and performance of the wing 24. However, examples in which the chordwise reinforcement elements 220 are not-pre-tensioned are also contemplated.

In the illustrated example, a location of each of the receiving apertures 149 along a wing thickness direction 105 differs from a location of each of the receiving channels 129 along the wing thickness direction 105 by an offset distance 150. The offset distance 150 in the wing thickness direction is sufficient to avoid interference between the chordwise reinforcement elements 220 and the spanwise reinforcement elements 200. In other words, the offset distance 150 enables both the chordwise reinforcement elements 220 and the spanwise reinforcement elements 200 to be inserted through the wing components 110, 120, 130 and into their respective assembled positions without the chordwise reinforcement elements 220 and the spanwise reinforcement elements 200 physically blocking each other from insertion and final placement. As illustrated, one or more receiving channels 129 may be spaced from the receiving apertures 149 by the offset distance 150 in a first direction (e.g., "above"), while one or more other receiving channels 129 may be spaced from the receiving apertures 149 by the offset distance 150 in an opposite second direction (e.g., "below").

In some applications, the chordwise reinforcement elements 220 and the spanwise reinforcement elements 200 cooperate to advantageously improve a structural performance of the wing 24 under bending and torsional loads. This advantage may be obtained in addition to the component bonding or structural advantages obtained by using either the spanwise reinforcement elements 200 or the chordwise reinforcement elements 220 in an absence of the other. Moreover, this advantage may be obtained in addition to, or in an absence of, the structural advantages that may be provided by additively manufacturing the central component 120 with the stacking direction z aligned with the chordwise direction 103.

In some examples, the offset distance 150 is selected to be as small as practically possible while still satisfying the avoidance of interference constraint, as the smaller offset distance 150 may tend to improve a capability of the wing 24 to withstand certain bending and torsional loads. In some such examples, one or more of the chordwise reinforcement elements 220 may come into contact with one or more of the spanwise reinforcement elements 200 when the wing 24 is subjected to bending or torsional loads, which may, for example, tend to reduce a deformation of the wing 24 under such loads.

Although FIGS. 16-20 illustrate the insertion of the chordwise reinforcement elements 220 prior to the insertion of the spanwise reinforcement elements 200 between spanwise-adjacent wing segments 32 (as described with respect to FIGS. 5-9), it is also contemplated that the insertion of one or more of the chordwise reinforcement elements 220 could occur after the insertion of the spanwise reinforcement elements 200 between the spanwise-adjacent wing segments 32.

Figures 21, 22:
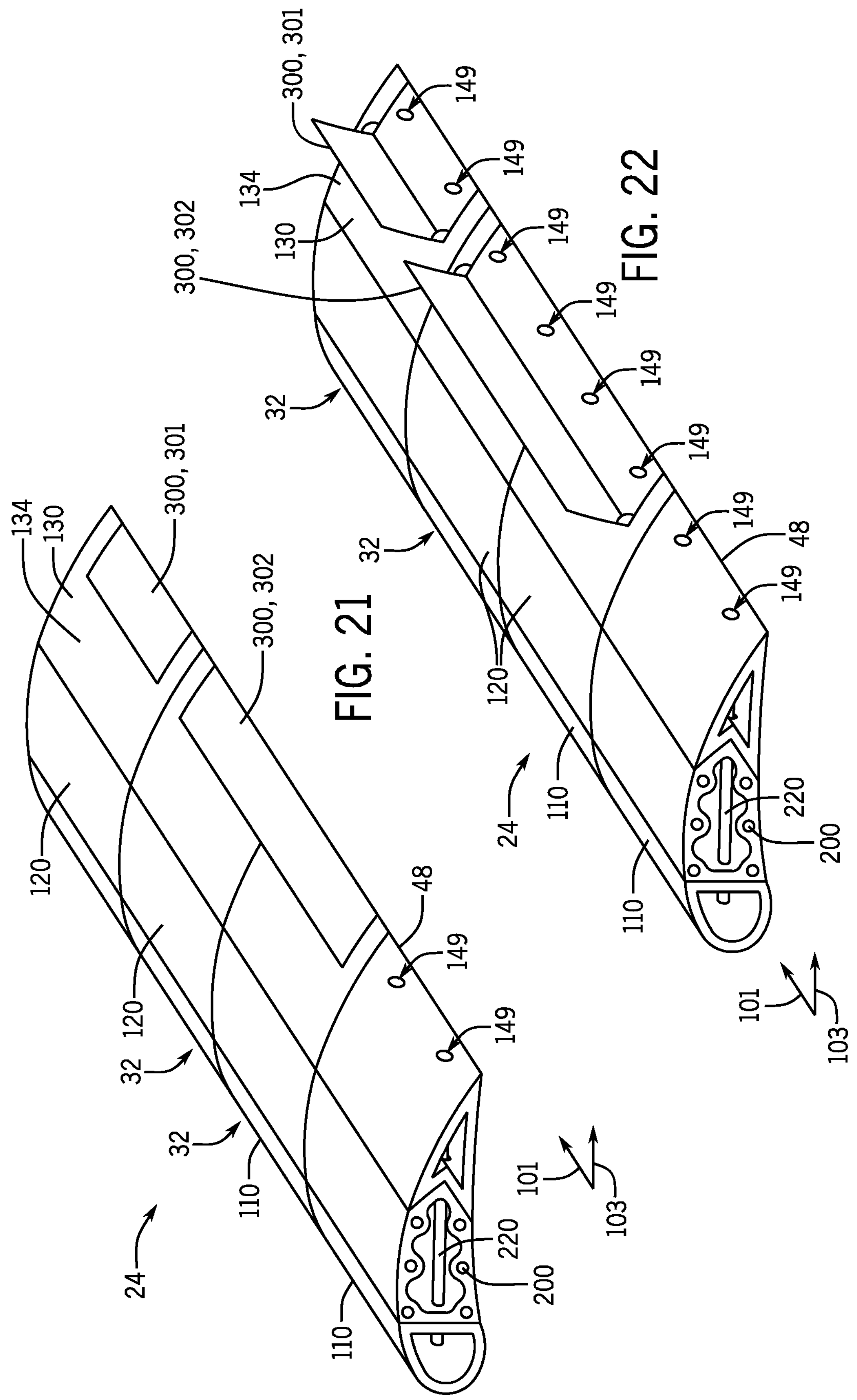
FIG. 21 illustrates an isometric view of a wing formed from the components of FIGS. 16 and 17 and further including one or more control surfaces in a closed or deactivated position according to at least one example of the present disclosure.
FIG. 22 illustrates another isometric view of the wing of FIG. 21 with the one or more control surfaces in an open or activated position according to at least one example of the present disclosure.

FIGS. 21 and 22 illustrate an example of the wing 24 including the chordwise reinforcement elements 220 and one or more control surfaces 300 coupled to the wing 24. More specifically, FIG. 21 illustrates the control surfaces 300 in a closed or inactivated position, and FIG. 22 illustrates the control surfaces 300 in an open or activated position. For example, the one or more control surfaces 300 include an aileron 301 and a flap 302. However, other control surfaces or combinations of control surfaces are also contemplated. Each control surface may be mounted on one or more wing segments 32.

In the example, the receiving apertures 149 of the wing segments 32 to which the control surfaces 300 are mounted are positioned under the control surfaces 300 when the control surfaces are in the closed or deactivated position. The chordwise reinforcement elements 220 may be installed in these wing segments 32 prior to coupling the control surfaces 300 to the wing segments 32. Alternatively, the chordwise reinforcement elements 220 may be installed after coupling the control surfaces 300 to the wing segments, by holding the control surfaces in the open or activated position during installation of the chordwise reinforcement elements 220. It is also contemplated that one or more of the receiving apertures 149 of the wing segments 32 to which the control surfaces 300 are mounted may be offset in the spanwise direction 101 from the control surface, such that installation of the chordwise reinforcement elements 220 in those apertures is not affected by the presence or absence of the control surfaces 300.

FIG. 23 is a flow diagram of an example method 2300 of making an airfoil structure for an aircraft. Method 2300 may include mating together at least two components adjacently along a chordwise direction (step 2304). As discussed above, the at least two components extend in the chordwise direction from a front surface to a back surface, the front surface defines a contour of a leading edge of the airfoil structure, and the back surface defines contour of a trailing edge of the airfoil structure. Each of the at least two components includes receiving apertures defined therein at one or more spanwise locations along a spanwise direction, and the receiving apertures at each of the one or more spanwise locations are aligned with each other in the chordwise direction. Method 2300 may further includes inserting a plurality of chordwise reinforcement elements through the aligned receiving apertures (step 2308).

In some examples, method 2300 may also include configuring the plurality of chordwise reinforcement elements to exert a compressive force in the chordwise direction on the at least two components. The configuring step may include, for example but not by way of limitation, pre-tensioning the chordwise reinforcement elements and, subsequent to the step of inserting the plurality of chordwise reinforcement elements, releasing the pre-tension. For example, the chordwise reinforcement elements in the pre-tensioned state may be bonded within the receiving apertures.

In some examples, a first component of the at least two components includes an outer wall that defines a hollow interior extending along the spanwise direction, and the outer wall defines a plurality of receiving channels. Method 2300 may further include inserting a plurality of spanwise reinforcement elements through the receiving channels of the first component. Moreover, method 2300 may include mating at least two additional components together adjacently along the chordwise direction, and coupling a first additional component of the at least two additional components adjacent, along the spanwise direction, to the first component. The first additional component may also include an outer wall that defines a hollow interior extending along the spanwise direction, and the outer wall of the first additional component may likewise define a plurality of receiving channels. Method 2300 additionally may include inserting the spanwise reinforcement elements through respective aligned sets of the receiving channels of the first component and the first additional component.

In some examples, the step of mating together the at least two components includes mating a first joining surface of a monolithic front component to a second joining surface of a monolithic second component, and the monolithic front component includes the front surface. In some such examples, the step of mating the first joining surface and the second joining surface includes mating the first joining surface and the second joining surface in a substantially face-to-face relationship. Moreover, in some such examples, the step of mating the first joining surface and the second joining surface includes mating one or more surface portions of the second joining surface in a substantially face-to-face relationship with one or more surface portions of the first joining surface. Also, in some such examples, the step of mating the first joining surface and the second joining surface includes mating complementary mating features of the second joining surface and the first joining surface. For example, the step of mating the complementary mating features may include mating together a slot defined in one of the first joining surface and the second joining surface and a complementary protrusion defined in the other of the first joining surface and the second joining surface.

In some examples, the step of mating together the at least two components may include coupling a base joining surface of a monolithic front component to a base surface of a monolithic central component, wherein the front component includes the front surface, and coupling a rear joining surface of a monolithic rear component to a rear surface of the central component, wherein the rear component includes the back surface.

In some examples, the step of inserting the plurality of chordwise reinforcement elements further includes inserting the plurality of chordwise reinforcement elements through at least one of the front surface and the back surface. Alternatively, in some examples, the step of inserting the plurality of chordwise reinforcement elements includes inserting the plurality of chordwise reinforcement elements through the receiving apertures of a middle component of the at least two components, such that first ends of the inserted chordwise reinforcement elements extend outside the middle component forward along the chordwise direction and second ends of the inserted chordwise reinforcement elements extend outside the middle component backward along the chordwise direction; sliding one or more of the receiving apertures of a front component of the at least two components over the first ends of the inserted chordwise reinforcement elements; and sliding one or more of the receiving apertures of a rear component of the at least two components over the second ends of the inserted chordwise reinforcement elements, such that the first ends are covered by the front surface and the second ends are covered by the back surface when the at least two components are mated together.

FIG. 24 is a flow diagram of an example method 2400 of making an airfoil structure for an aircraft. Method 2400 may include coupling a base joining surface of a monolithic front component, such as the base joining surface 114 of the additively manufactured front component 110, to a base surface of a monolithic central component, such as the base surface 122 of the additively manufactured central component (step 2404). The front component may include a front surface, such as the front surface 112, that defines a contour of a leading edge of the wing. Method 2400 may also include coupling a rear joining surface of a monolithic rear component, such as the rear joining surface 132 of the additively manufactured rear component 130, to a rear surface of the central component, wherein the front component, the central component, and the rear component are coupled together in a chordwise direction (step 2408).

In some examples, step 2404 may include mating the base surface and the base joining surface in a substantially face-to-face relationship. Additionally or alternatively, step 2408 may include mating one or more surface portions of the rear joining surface, such as the two halves of the wedge-receiving-shaped rear joining surface 132 as shown in FIG. 5, in a substantially face-to-face relationship with one or more surface portions of the rear surface, such as the two halves of the wedge-shaped rear surface 124 as shown in FIG. 5.

In some examples, step 2404 may include coupling complementary mating features of the base surface and the base joining surface, or step 2408 may include coupling complementary mating features of the rear surface and the rear joining surface, as described with respect to FIGS. 11-15. In either case, the step of coupling the complementary mating features may include sliding a protrusion defined in one of the surfaces into a complementary slot defined in the other of the surfaces.

The method 2400 may include additional or alternative steps. For example, method 2400 may include additively manufacturing the central component in a stacking direction generally aligned with the chordwise direction, and may also include additively manufacturing at least one of the front component and the rear component in a stacking direction generally aligned with a spanwise direction of the wing.

For another example, the method 2400 may include coupling a second front component 110, a second central component 120, and a second rear component 130 adjacent, along the spanwise direction 101, to the first front component 110, the first central component 120, and the first rear component 130. The components may be interleaved, for example as shown in FIG. 10. Additionally or alternatively, the first and second central components 120 may each include the outer wall 126 that defines the hollow interior 127 extending along the spanwise direction 101, the outer wall may define a plurality of receiving channels 129, and the method may further include inserting each of the plurality of spanwise reinforcement elements 200 within respective aligned sets of the receiving channels 129 of the first and second central components 120.

For another example, the front component, the central component, and the rear component may include receiving apertures, such as receiving apertures 149, at one or more spanwise locations along the spanwise direction 101, the receiving apertures at each of the one or more spanwise locations may be aligned with each other in the chordwise direction 103, and the method may further include inserting the plurality of chordwise reinforcement elements 220 through the aligned receiving apertures. In some such examples, the central component 120 may include the outer wall 126 that defines the hollow interior 127 extending along the spanwise direction 101, the outer wall may define the plurality of receiving channels 129, and the method may further include inserting the plurality of spanwise reinforcement elements 200 within the receiving channels of the central component. Further, the method may include positioning each of the receiving apertures 149 along the wing thickness direction 105, and positioning each of the receiving channels 129 along the wing thickness direction at the offset distance 150 sufficient to avoid interference between the chordwise reinforcement elements 220 and the spanwise reinforcement elements 200.

While preferred examples of the present inventive concept have been shown and described herein, it will be obvious to those skilled in the art that such examples are provided by way of example only. Numerous variations, changes, and substitutions will now occur to those skilled in the art without departing from the disclosure. For example, reference to an element or method step in one example does not preclude the use of the element or method step in other examples that may include different combinations of elements or method steps disclosed herein. It should be understood that various alternatives to the examples of the disclosure described herein can be employed in practicing the disclosure. It is intended that the following claims define the scope of the disclosure and that methods and structures within the scope of these claims and their equivalents be covered thereby.

The invention claimed is:

1. An airfoil structure for an aircraft, the airfoil structure comprising at least one airfoil segment and defining a cross-sectional airfoil shape extending chord-wise, the airfoil structure comprising:

at least three distinct and separately-formed components that are mated together and aligned along a chordwise direction of the cross-sectional airfoil shape, wherein:

the chordwise direction extends from a leading edge to a trailing edge of the cross-sectional airfoil shape, the leading edge is at an extremity of the cross-sectional airfoil shape and defines a portion of the cross-sectional airfoil shape, the trailing edge is at an opposite extremity of the cross-sectional airfoil shape than the leading edge and defines a second portion of the cross-sectional airfoil shape, the at least three distinct and separately-formed components combine to extend in the chordwise direction completely from the leading edge to the trailing edge, each of the at least three distinct and separately-formed components includes receiving apertures defined therein at one or more spanwise locations along a spanwise direction, the receiving apertures at each of the one or more spanwise locations aligned with each other in the chordwise direction, the at least three distinct and separately-formed components are arranged sequentially along the chordwise direction at a first spanwise location of the one or more spanwise locations, and the at least three distinct and separately-formed components comprise:

a first component that defines the leading edge of the cross-sectional airfoil shape, the leading edge being defined at at least the first spanwise location of the one or more spanwise locations;

a second component; and a third component that defines the trailing edge of the cross-sectional airfoil shape, the trailing edge being defined at at least the first spanwise location of the one or more spanwise locations; and a plurality of chordwise reinforcement elements extending through the aligned receiving apertures, wherein at least one of the plurality of chordwise reinforcement elements extends from the first component, through the second component, and to the third component.

2. The airfoil structure of claim 1, wherein the plurality of chordwise reinforcement elements are configured to exert a compressive force in the chordwise direction on the at least three distinct and separately-formed components.

3. The airfoil structure of claim 1, wherein one component of the at least three distinct and separately-formed components comprises an outer wall that defines a hollow interior extending along the spanwise direction, wherein the outer wall defines a plurality of receiving channels, and wherein the airfoil structure further comprises a plurality of spanwise reinforcement elements extending within the receiving channels of the one component.

4. The airfoil structure of claim 3, wherein the airfoil structure comprises a plurality of airfoil segments aligned along the spanwise direction, a first airfoil segment comprising the at least three distinct and separately-formed components, and a second airfoil segment comprising at least three additional components mated together and aligned along the chordwise direction, wherein a first additional component of the at least three additional components is coupled adjacent, along the spanwise direction, to the one component and comprises an outer wall that defines a hollow interior extending along the spanwise direction, wherein the outer wall of the first additional component defines a plurality of receiving channels, and wherein the plurality of spanwise reinforcement elements extend within respective aligned sets of the plurality of receiving channels of the one component and the first additional component.

5. The airfoil structure of claim 1, wherein:

the first component is additively manufactured and comprises a first joining surface that extends from a pressure side of the cross-sectional airfoil shape to a suction side of the cross-sectional airfoil shape, the second component comprises a second joining surface that extends from the pressure side of the cross-sectional airfoil shape to the suction side of the cross-sectional airfoil shape, and the second joining surface of the second component is mated to the first joining surface of the first component.

6. The airfoil structure of claim 5, wherein the first joining surface and the second joining surface are mated in a substantially face-to-face relationship.

7. The airfoil structure of claim 5, wherein the second joining surface comprises one or more surface portions mated in a substantially face-to-face relationship with one or more surface portions of the first joining surface.

8. The airfoil structure of claim 5, wherein the second joining surface and the first joining surface include complementary mating features.

9. The airfoil structure of claim 1, wherein the airfoil structure is selected from the group consisting of a wing, a horizontal tail, and a vertical tail.

10. A method of making an airfoil structure, the airfoil structure comprising at least one airfoil segment and defining a cross-sectional airfoil shape extending chord-wise, the method comprising:

forming at least three distinct and separately-formed components;

mating together the at least three distinct and separately-formed components such that they are aligned along a chordwise direction of the cross-sectional airfoil shape, wherein:

the chordwise direction extends from a leading edge to a trailing edge of the cross-sectional airfoil shape, the leading edge is at an extremity of the cross-sectional airfoil shape and defines a portion of the cross-sectional airfoil shape, the trailing edge is at an opposite extremity of the cross-sectional airfoil shape than the leading edge and defines a portion of the cross-sectional airfoil shape, the at least three distinct and separately-formed components combine to extend in the chordwise direction completely from the leading edge to the trailing edge, each of the at least three distinct and separately-formed components includes receiving apertures defined therein at one or more spanwise locations along a spanwise direction, the receiving apertures at each of the one or more spanwise locations aligned with each other in the chordwise direction, the at least three distinct and separately-formed components are arranged sequentially along the chordwise direction at a first spanwise location of the one or more spanwise locations, and the at least three distinct and separately-formed components comprise:

a first component that defines the leading edge of the cross-sectional airfoil shape, the leading edge being defined at at least the first spanwise location of the one or more spanwise locations;

a second component; and a third component that defines a trailing edge of the cross-sectional airfoil shape, the trailing edge being defined at at least the first spanwise location of the one or more spanwise locations, wherein at least a portion of the second component is positioned between the first component and the third component along the chordwise direction at the fist spanwise location; and inserting a plurality of chordwise reinforcement elements through the aligned receiving apertures such that at least one of the plurality of chordwise reinforcement elements extends from the first component, through the second component, and to the third component.

11. The method of claim 10, further comprising configuring the plurality of chordwise reinforcement elements to exert a compressive force in the chordwise direction on the at least three distinct and separately-formed components.

12. The method of claim 11, wherein the step of configuring the plurality of chordwise reinforcement elements to exert a compressive force in the chordwise direction on the at least three distinct and separately-formed components comprises:

pre-tensioning the plurality of chordwise reinforcement elements; and subsequent to the step of inserting the plurality of chordwise reinforcement elements, releasing the pre-tension from the plurality of chordwise reinforcement elements.

13. The method of claim 10, wherein one component of the at least three distinct and separately-formed components comprises an outer wall that defines a hollow interior extending along the spanwise direction, wherein the outer wall defines a plurality of receiving channels, and wherein the method further comprises inserting a plurality of spanwise reinforcement elements through the plurality of receiving channels of the one component.

14. The method of claim 13, further comprising:

mating at least three additional components together and aligned along the chordwise direction;

coupling a first additional component of the at least three additional components adjacent, along the spanwise direction, to one of the at least three distinct and separately-formed components, wherein the first additional component includes an outer wall that defines a hollow interior extending along the spanwise direction, and wherein the outer wall of the first additional component defines a plurality of receiving channels; and inserting the spanwise reinforcement elements through respective aligned sets of the receiving channels of the one of the at least three distinct and separately-formed components and the first additional component.

15. The method of claim 14, wherein the step of mating together the at least three distinct and separately-formed components comprises mating a first joining surface of the first component to a second joining surface of the second component.

16. The method of claim 15, wherein the step of mating the first joining surface and the second joining surface comprises mating one or more surface portions of the second joining surface in a substantially face-to-face relationship with one or more surface portions of the first joining surface.

17. The method of claim 15, wherein the step of mating the first joining surface and the second joining surface comprises mating complementary mating features of the second joining surface and the first joining surface.

18. The method of claim 10, wherein the step of inserting the plurality of chordwise reinforcement elements further comprises:

inserting the plurality of chordwise reinforcement elements through the receiving apertures of the second component of the at least three distinct and separately-formed components, such that first ends of the inserted chordwise reinforcement elements extend outside the second component forward along the chordwise direction and second ends of the inserted chordwise reinforcement elements extend outside the second component backward along the chordwise direction;

sliding one or more of the receiving apertures of the first component over the first ends of the inserted chordwise reinforcement elements; and sliding one or more of the receiving apertures of the third component over the second ends of the inserted chordwise reinforcement elements, wherein the first ends are covered by a front surface of the first component and the second ends are covered by a back surface of the third component when the at least three distinct and separately-formed components are mated together.

19. The airfoil structure of claim 1, wherein the cross-sectional airfoil shape is defined at least at one of the one or more spanwise locations where the receiving apertures are defined.

20. The airfoil structure of claim 1, wherein the first component is additively manufactured, the second component is additively manufactured, and the third component is additively manufactured.

21. The airfoil structure of claim 1, wherein the second component is positioned entirely between the first component and the third component along the chordwise direction at the first spanwise location.

22. An airfoil structure for an aircraft, the airfoil structure comprising at least one airfoil segment and defining a cross-sectional airfoil shape, the airfoil structure comprising:

at least three components mated together and aligned along a chordwise direction of the cross-sectional airfoil shape, wherein:

the chordwise direction extends from a leading edge to a trailing edge of the cross-sectional airfoil shape, the leading edge is at an extremity of the cross-sectional airfoil shape and defines a portion of the cross-sectional airfoil shape, the trailing edge is at an opposite extremity of the cross-sectional airfoil shape than the leading edge and defines a second portion of the cross-sectional airfoil shape, the at least three components combine to extend in the chordwise direction completely from the leading edge to the trailing edge, each of the at least three components includes receiving apertures defined therein at one or more spanwise locations along a spanwise direction, the receiving apertures at each of the one or more spanwise locations aligned with each other in the chordwise direction, and the at least three components comprise:

a front additively manufactured component that defines the leading edge of the cross-sectional airfoil shape;

a rear additively manufactured component that defines the trailing edge of the cross-sectional airfoil shape; and a central additively manufactured component configured to couple the front and rear components, and define a central portion of the cross-sectional airfoil shape; and a plurality of chordwise reinforcement elements extending through the aligned receiving apertures, wherein each of the plurality of chordwise reinforcement elements extends through the central additively manufactured component and into the front additively manufactured component and the rear additively manufactured component via the aligned receiving apertures.

* * * * *